(12) United States Patent
Suzuki

(10) Patent No.: US 10,302,928 B2
(45) Date of Patent: May 28, 2019

(54) SAMPLE OBSERVATION DEVICE

(71) Applicant: Olympus Corporation, Tokyo (JP)

(72) Inventor: Yoshimasa Suzuki, Kawasaki (JP)

(73) Assignee: OLYMPUS CORPORATION, Tokyo (JP)

( * ) Notice: Subject to any disclaimer, the term of this patent is extended or adjusted under 35 U.S.C. 154(b) by 292 days.

(21) Appl. No.: 15/189,354

(22) Filed: Jun. 22, 2016

(65) Prior Publication Data
US 2016/0306155 A1  Oct. 20, 2016

Related U.S. Application Data

(63) Continuation of application No. PCT/JP2014/077277, filed on Oct. 7, 2014.

(30) Foreign Application Priority Data

Dec. 27, 2013  (JP) .................. 2013-271742

(51) Int. Cl.
G02B 21/14 (2006.01)
G02B 21/24 (2006.01)
(Continued)

(52) U.S. Cl.
CPC ............. G02B 21/14 (2013.01); G02B 21/24 (2013.01); G02B 21/26 (2013.01); G02B 21/365 (2013.01); H04N 5/2254 (2013.01)

(58) Field of Classification Search
CPC .... G02B 21/06; G02B 21/0076; G02B 21/16; G02B 21/0032; G02B 21/367;
(Continued)

(56) References Cited

U.S. PATENT DOCUMENTS 7,505,200 B2  3/2009 Krueger
9,041,788 B2  5/2015 Ishiwata
(Continued)

FOREIGN PATENT DOCUMENTS

JP  51-029149 A  3/1976
JP  2004-126590 A  4/2004
JP  2012-073591 A  4/2012

OTHER PUBLICATIONS

International Preliminary Report on Patentability dated Jul. 7, 2016, issued in International Application No. PCT/JP2014/077277.
(Continued)

Primary Examiner — Evan P Dzierzynski
Assistant Examiner — Sharrief I Broome
(74) Attorney, Agent, or Firm — Hunton Andrews Kurth LLP

(57) ABSTRACT

A sample observation device includes an illumination optical system and an observation optical system. The illumination optical system includes a light source, a condenser lens, and an aperture member. The observation optical system includes an objective lens and an imaging lens. The aperture member has a light-shielding part or a darkening part, and a transmission part. The transmission part is disposed asymmetrically with respect to an optical axis of the illumination optical system. An image of an inner edge of the transmission part is formed inside of an outer edge of a pupil of the objective lens. An image of an outer edge of the transmission part is formed outside of the outer edge of the pupil of the objective lens.

14 Claims, 24 Drawing Sheets

(51) Int. Cl.
*G02B 21/26* (2006.01)
*G02B 21/36* (2006.01)
*H04N 5/225* (2006.01)

(58) Field of Classification Search
CPC .... G02B 21/26; G02B 21/008; G02B 21/361; G02B 21/14; G02B 27/58; G02B 21/0048; G02B 21/025; G02B 21/34; G02B 21/0072; G02B 21/002; G02B 21/0044; G02B 21/08
See application file for complete search history.

(56) References Cited

U.S. PATENT DOCUMENTS

| | | | | |
|---|---|---|---|---|
| 2003/0058530 A1* | 3/2003 | Kawano | ............... | G02B 21/002 359/385 |
| 2012/0057013 A1* | 3/2012 | Ishiwata | .............. | G02B 21/367 348/78 |

OTHER PUBLICATIONS

International Search Report dated Jan. 20, 2015, issued in International Application No. PCT/JP2014/077277.

* cited by examiner

FIG. 5A
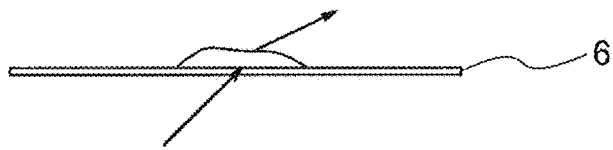
FIG. 5B
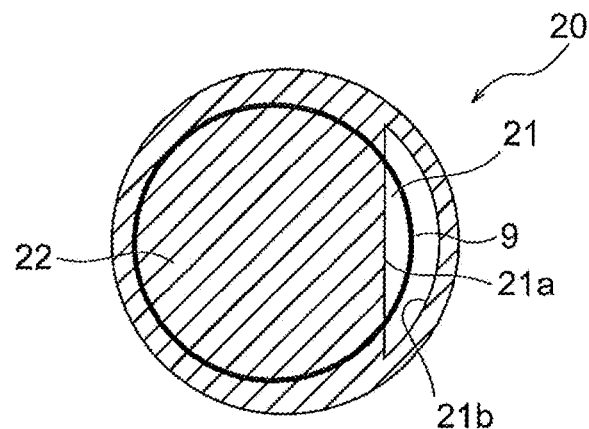
FIG. 5C
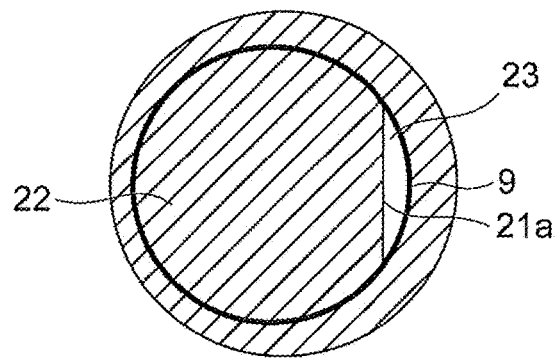

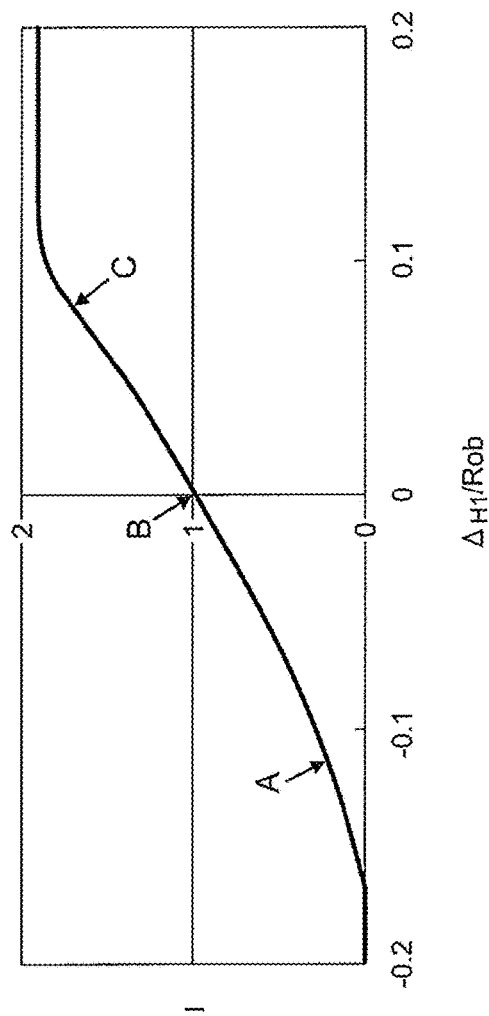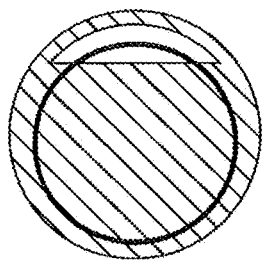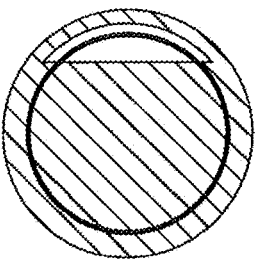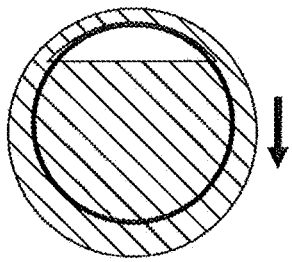

SAMPLE OBSERVATION DEVICE

CROSS-REFERENCE TO RELATED APPLICATION

The present application is a continuation application of PCT/JP2014/077277 filed on Oct. 7, 2014 which is based upon and claims the benefit of priority from Japanese Patent Application No. 2013-271742 filed on Dec. 27, 2013; the entire contents of which are incorporated herein by reference.

BACKGROUND OF THE INVENTION

Field of the Invention

The present invention relates to a sample observation device.

Description of the Related Art

As a method for observing a colorless and transparent sample, modulation contrast method is available. In an observation device using the modulation contrast method, an aperture plate is disposed at the illumination optical system, and a modulator is disposed at the observation optical system. Here, the aperture plate is conjugate to the modulator. Moreover, at the aperture plate, a rectangular transmission part is formed at a position away from the optical axis (the center of the aperture plate). Meanwhile, at the modulator, a plurality of regions having mutually different transmittance are formed. These regions are formed to be adjacent to each other. These regions each have a dimension (width) capable of including an image of the transmission part.

As stated above, the transmission part is formed at a position away from the optical axis. Therefore, illumination light passing through the transmission part is emitted from a condenser lens so as to illuminate a sample from an oblique direction. The illumination light emitted from the condenser lens passes through the sample and reaches the modulator. Here, three regions of region A (transmittance 100%), region B (transmittance 20%) and region C (transmittance 0%) are formed at the modulator, for example.

In the case where a surface of the sample is flat, a light flux passing through the sample reaches the region B of the modulator. As a result, a sample image having brightness corresponding to the transmittance of the region B is formed. When the sample surface is an inclined face that is an upward-slope to the right, the light flux is refracted to the right at the time of passing through the sample. In this case, the light flux passing through the sample reaches the region C of the modulator. As a result, a sample image having brightness corresponding to the transmittance of the region C is formed. When the sample surface is an inclined face that is an upward-slope to the left, the light flux is refracted to the left at the time of passing through the sample. In this case, the light flux passing through the sample reaches the region A of the modulator. As a result, a sample image having brightness corresponding to the transmittance of the region A is formed. As just described, when the sample is colorless and transparent, and has a flat face and an inclined face, then the flat face part in the sample image appears gray, and the inclined face part appears black or white.

As just described, in the modulation contrast method, it is possible to observe a colorless and transparent sample as well as an image that has a shadow (contrast) and gives a three-dimensional appearance. As observation devices using the modulation contrast method, observation devices described in Japanese Patent Application Laid-Open No. Sho 51-29149 and Japanese Patent Application Laid-Open No. 2004-126590 are available.

SUMMARY OF THE INVENTION

A sample observation device according to the present invention includes:
an illumination optical system and an observation optical system, wherein
the illumination optical system includes a light source, a condenser lens, and an aperture member,
the observation optical system includes an objective lens and an imaging lens,
the aperture member has a light-shielding part or a darkening part, and a transmission part,
the transmission part is disposed asymmetrically with respect to an optical axis of the illumination optical system,
an image of an inner edge of the transmission part is formed inside of an outer edge of a pupil of the objective lens,
an image of an outer edge of the transmission part is formed outside of the outer edge of the pupil of the objective lens, and
the transmission part is a transmission part that has a bow shape defined by a straight line on a side closer to the optical axis and an arc on a side away from the optical axis.

A sample observation device according to the present invention includes:
a light source, an optical system, and a holding member configured to hold an object, wherein
the optical system includes a first optical system and a second optical system,
the first optical system and the second optical system are disposed to be opposed to each other with the holding member interposed therebetween,
the first optical system includes an aperture member,
the optical system is configured to form an image of a transmission part of the aperture member at a pupil position of the second optical system,
the transmission part is disposed asymmetrically with respect to an optical axis of the first optical system,
an image of an inner edge of the transmission part is formed inside of an outer edge of a pupil of the second optical system,
an image of an outer edge of the transmission part is formed outside of the outer edge of the pupil of the second optical system,
the transmission part is a transmission part that has a bow shape defined by a straight line on a side closer to the optical axis and an arc on a side away from the optical axis,
an image of the transmission part is decentered with respect to the pupil of the second optical system by refraction caused by an object,
a quantity of light passing through the pupil of the second optical system by the decentering in one direction differs from that by the decentering in another direction opposite to the one direction,
the decentering in the one direction increases the quantity of light passing through the pupil of the second optical system, and
the decentering in the other direction reduces the quantity of light passing through the pupil of the second optical system.

BRIEF DESCRIPTION OF THE DRAWINGS

FIG. 2A is a diagram showing an aperture member having a light-shielding part on the outside of a transmission part, and FIG. 2B is a diagram showing an aperture member not having a light-shielding part on the outside of a transmission part;

FIG. 3A is a diagram showing refraction of light at the sample position, FIG. 3B is a diagram showing the relation between the pupil of the objective lens and the image of the aperture member, and FIG. 3C shows light flux passing through the pupil of the objective lens;

FIG. 4A is a diagram showing refraction of light at the sample position, FIG. 4B is a diagram showing the relation between the pupil of the objective lens and the image of the aperture member, and FIG. 4C is a diagram showing light flux passing through the pupil of the objective lens;

FIG. 5A, FIG. 5B, and FIG. 5C are diagrams showing the relation between the pupil of the objective lens and the image of the aperture member when a sample having a surface inclined downward to the right is present. FIG. 5A is a diagram showing refraction of light at the sample position, FIG. 5B is a diagram showing the relation between the pupil of the objective lens and the image of the aperture member, and FIG. 5C is a diagram showing light flux passing through the pupil of the objective lens;

FIG. 6A is a diagram showing $L_0$ and $L_1$ in an aperture member, FIG. 6B is a diagram showing $L_0$ and $L_1$ in another aperture member, and FIG. 6C is a diagram showing $R_{ob}$ at the pupil of the objective lens;

FIG. 7A is a diagram showing the image of the aperture member not displaced with respect to the pupil of the objective lens, and FIG. 7B is a diagram showing the image of the aperture member displaced in the direction along a first axis with respect to the pupil of the objective lens;

FIG. 8A, FIG. 8B, FIG. 8C, and FIG. 8D are diagrams showing the relation of displacement of the image of the aperture member with respect to the pupil of the objective lens and the relation between the displacement amount $\Delta_{H1}$ and the amount of light flux I, where FIG. 8A is a graph showing the relation between the displacement amount $\Delta_{H1}$ and the amount of light flux I, FIG. 8B and FIG. 8D are diagrams showing a case where displacement of the image of the aperture member occurs, and FIG. 8C is a diagram showing a case where no displacement of the image of the aperture member occurs;

FIG. 9A is a diagram showing the image of the aperture member displaced with respect to the pupil of the objective lens, and FIG. 9B is a graph showing the relation between the displacement amount $\Delta_{V1}$ and the amount of light flux I;

FIG. 10A is a diagram showing an aperture member having a light-shielding part formed on the outside of a transmission part, and FIG. 10B is a diagram showing an aperture member not having a light-shielding part on the outside of a transmission part;

FIG. 11A is a diagram showing the direction in which the image of the aperture member in the first modification is displaced with respect to the pupil of the objective lens, FIG. 11B is a graph showing the relation between the displacement amount $\Delta_{H2}$ and the amount of light flux I, and FIG. 11C is a graph showing the relation between the displacement amount $\Delta_{V2}$ and the amount of light flux I;

FIG. 12A is a diagram showing the transmission part positioned leftward in the first axis, FIG. 12B is a diagram showing the transmission part positioned upward in the second axis, and FIG. 12C is a diagram showing the transmission part positioned rightward in the first axis;

FIG. 13A is an electronic image when the transmission part is positioned at the position in FIG. 12A, FIG. 13B is an electronic image when the transmission part is positioned at the position in FIG. 12C, and FIG. 13C is an electronic image obtained by the phase contrast method;

FIG. 14A is a diagram showing the aperture member in a second modification, FIG. 14B is a diagram showing the aperture member in a third modification, FIG. 14C is a diagram showing the aperture member in a fourth modification, FIG. 14D is a diagram showing the aperture member in a fifth modification, and FIG. 14E is a diagram showing the aperture member in a sixth modification;

FIG. 15A is a diagram showing an aperture member having a light-shielding part and an additional light-shielding part provided outside of a transmission part, FIG. 15B is a diagram showing an aperture member having a plurality of transmission parts, and FIG. 15C is a diagram showing an aperture member having a plurality of light sources disposed in a transmission part;

FIG. 16A is a diagram showing the configuration of an aperture member having a transmission part at the center, FIG. 16B is a diagram showing the configuration of an aperture member having a circular light-shielding part and a ring transmission part at the central portion, and FIG. 16C is a diagram showing the configuration of an aperture member having a second transmission part outside of the light-shielding part;

FIG. 17A is a diagram showing the image of a first transmission part formed inside of the outer edge of the pupil of the objective lens, and FIG. 17B is a diagram showing the image of the first transmission part formed at the position of the outer edge of the pupil of the objective lens;

FIG. 20A is a diagram showing a configuration of the aperture member on the illumination optical system side, and FIG. 20B is a diagram showing a configuration of the aperture member on the observation optical system side;

FIG. 21A, FIG. 21C, and FIG. 21E are diagrams each showing refraction of light at the sample position, and FIG. 21B, FIG. 21D, and FIG. 21F are diagrams each showing the relation between the aperture member on the observation optical system side and the image of the aperture member on the illumination optical system side;

FIG. 23A is an electronic image when the transmission part is positioned at the position in FIG. 12A, FIG. 23B is an electronic image when the transmission part is positioned at the position in FIG. 12C, FIG. 23C and FIG. 23D are both differential images, FIG. 23C is an image obtained by subtracting the image in FIG. 23B from the image in FIG. 23A, and FIG. 23D is an image obtained by subtracting the image in FIG. 23A from the image in FIG. 23B; FIG. 24A is an electronic image when the transmission part is positioned at the position in FIG. 12A, FIG. 24B is an electronic image when the transmission part is positioned at the position in FIG. 12C, FIG. 24C and FIG. 24D are both divisional images, FIG. 24C is an image obtained by dividing the image in FIG. 24A by the image in FIG. 24B, and FIG. 24D is an image obtained by dividing the image in FIG. 24B by the image in FIG. 24A.

DETAILED DESCRIPTION OF THE INVENTION

Action and effect of embodiments according to certain aspects of the present invention will be described below. An action and effect of the present embodiment will be described specifically by describing concrete examples. However, the aspects exemplified thereof are some of the aspects included in the present invention, and there is a large number of variations in these aspects. Therefore, the present invention is not restricted to the aspects that are exemplified.

A sample observation method of an embodiment and a sample observation device of an embodiment are described below. The sample observation device and the sample observation method in the following each embodiment is used in a state of bright-field observation. In the bright-field observation of the present embodiment, a fluorescent mirror unit including an excitation filter, a dichroic mirror, and an absorption filter is not used as with fluorescent observation. Therefore, in the state of bright-field observation, when a sample is colorless and transparent, the wavelength band of light forming a sample image (hereinafter, referred to as the "imaging light" as appropriate) agrees with a part of the wavelength band of light illuminating the sample (hereinafter, referred to as the "illumination light" as appropriate), or the wavelength band of the imaging light agrees with the wavelength band of the illumination light.

Moreover, in the bright-field observation of the sample observation device and the sample observation method of the present embodiment, a phase film in phase-contrast observation or a differential interference prism in differential interference observation is not used. Moreover, in the bright-field observation of the present embodiment, a modulator in the modulation contrast observation is not used.

The sample observation device of the present embodiment includes an illumination optical system and an observation optical system, and the illumination optical system includes a light source, a condenser lens, and an aperture member, and the observation optical system includes an objective lens and an imaging lens, and the aperture member has a light-shielding part or a darkening part, and a transmission part, and the transmission part is disposed asymmetrically with respect to an optical axis of the illumination optical system, and an image of an inner edge of the transmission part is formed inside of an outer edge of a pupil of the objective lens, and an image of an outer edge of the transmission part is formed outside of the outer edge of the pupil of the objective lens.

Figure 1:
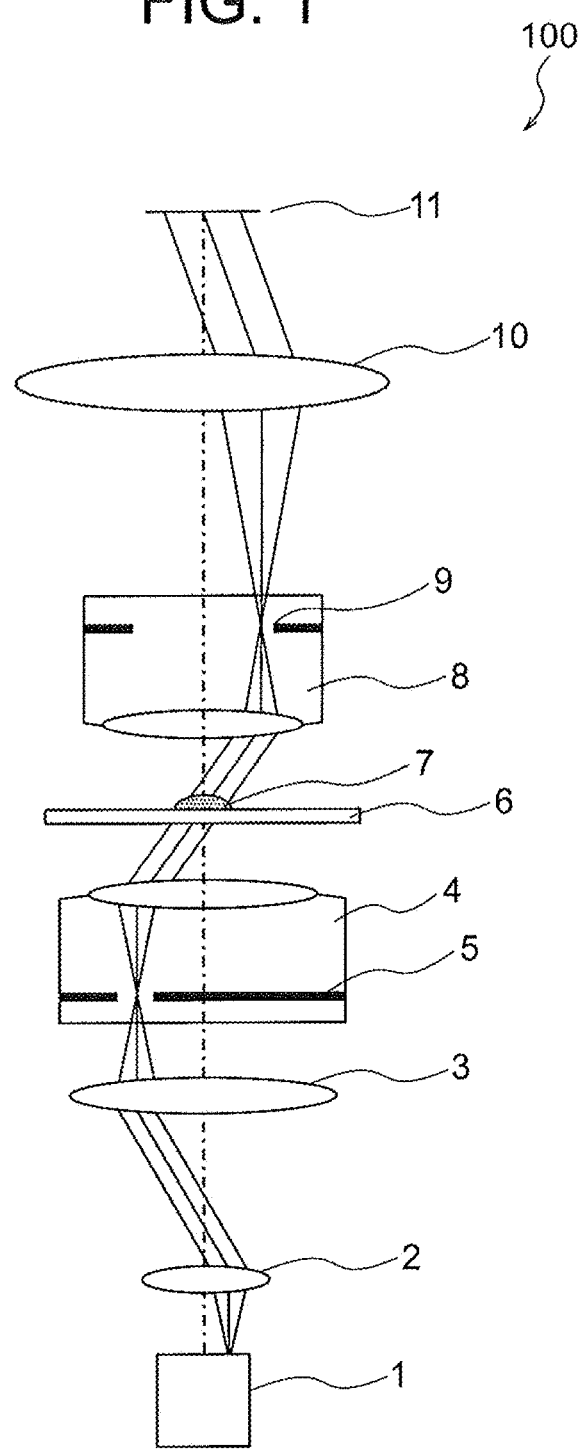
FIG. 1 is a diagram showing the configuration of a sample observation device of the present embodiment.

Referring to FIG. 1, the sample observation device of the present embodiment is described below. FIG. 1 is a diagram showing the configuration of the sample observation device of the present embodiment.

A sample observation device 100 is an upright microscope, for example, which includes an illumination optical system and an observation optical system. The illumination optical system includes a light source 1, a condenser lens 4 and an aperture member 5. The illumination optical system includes a lens 2 and a lens 3 as needed. Meanwhile, the observation optical system includes an objective lens 8 and an imaging lens 10.

Light emitted from the light source 1 passes through the lens 2 and the lens 3, and reaches the condenser lens 4. At the condenser lens 4, the aperture member 5 is provided. Herein, the condenser lens 4 and the aperture member 5 are integrally configured. However, the aperture member 5 and the condenser lens 4 may be configured as separate bodies.

Moreover, in place of the condenser lens 4, a condenser unit having a reflecting surface may be used. The condenser unit may include, for example, a conical mirror and a concave mirror. The conical mirror is disposed on the optical axis. The concave mirror has an annular reflecting surface and is disposed to surround the conical mirror.

Figure 2A:
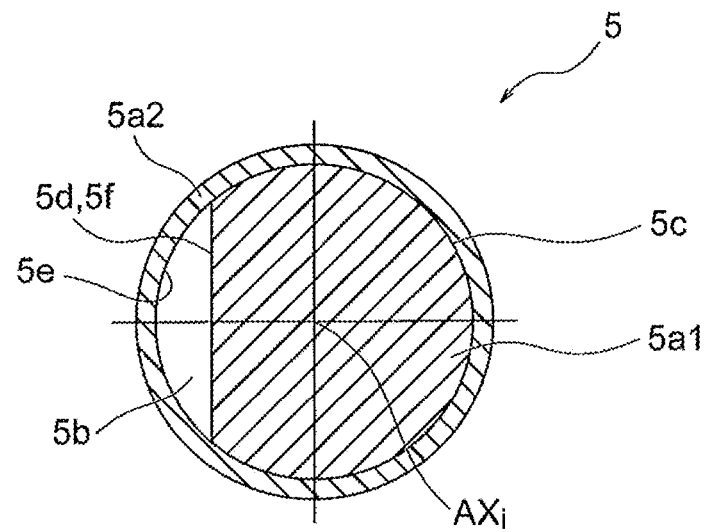
FIG. 2A and FIG. 2B are diagrams showing the configuration of an aperture member, where
Figure 2B:
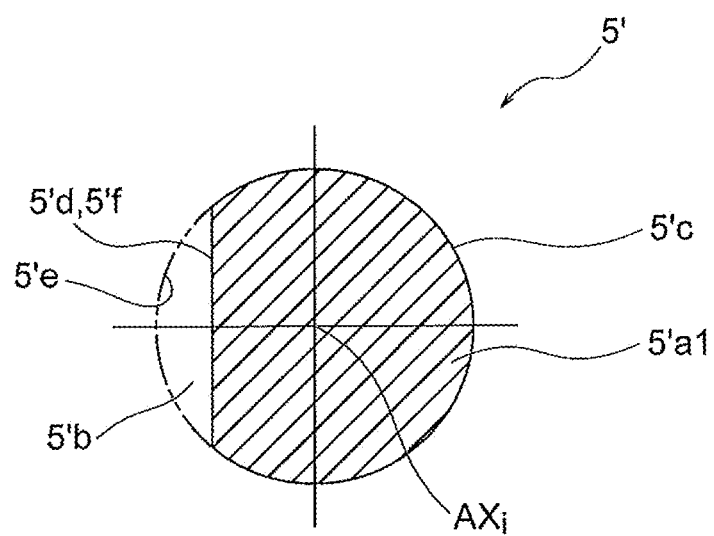

The aperture member will now be described. FIG. 2A and FIG. 2B are diagrams showing a configuration of the aperture member, where FIG. 2A is a diagram showings an aperture member having a light-shielding part on the outside of the transmission part. FIG. 2B is a diagram showing an aperture member not having a light-shielding part on the outside of the transmission part. A darkening part may be used in place of the light-shielding part.

First, the aperture member 5 will be described. As shown in FIG. 2A, the aperture member 5 has a light-shielding part 5a1, a light-shielding part 5a2, and a transmission part 5b. FIG. 2A depicts the light-shielding part 5a1 and the light-shielding part 5a2 in a distinguishable manner, for convenience of explanation. However, both portions do not have to be distinguished from each other. The light-shielding part 5a1 and the light-shielding part 5a2 may be formed from a single member.

In the aperture member 5, the light-shielding part 5a1 and the light-shielding part 5a2 are formed from an opaque member, for example, a metal plate. In this case, the transmission part 5b is a gap (hole) formed in a metal plate. Alternatively, the light-shielding parts 5a1 and 5a2 and the transmission part 5b are formed from a transparent member, for example, a glass plate or a resin plate. In this case, the light-shielding part 5a1 and the light-shielding part 5a2 are formed, for example, by applying light-shielding paint on a glass plate, but the transmission part 5b is not coated. The transmission part 5b is thus a glass plate per se.

The light-shielding part 5a1 is formed so as to include the optical axis $AX_i$ of the illumination optical system. The shape of the light-shielding part 5a1 is defined by a first outer edge 5c and a second outer edge 5d. Both ends of the first outer edge 5c are connected to each other with the second outer edge 5d. In FIG. 2A, the first outer edge 5c is part of a circumference, and the second outer edge 5d is a straight line. As indicated by the first outer edge 5c and the second outer edge 5d, the light-shielding part 5a1 is shaped in the form of a circle with a cut-off segment, that is, a D-cut shape.

The shape of the transmission part 5b is defined by an outer edge 5e and an inner edge 5f. Both ends of the outer edge 5e are connected to each other with the inner edge 5f. In FIG. 2A, the outer edge 5e is part of a circumference, and the inner edge 5f is a straight line. As indicated by the outer edge 5e and the inner edge 5f, the transmission part 5b is shaped in the form of a circle with a cut-off segment, that is, a bow shape.

The shape of the light-shielding part 5a2 is a ring. Although the light-shielding part 5a2 is not necessarily provided, the provision of the light-shielding part 5a2 outside of the light-shielding part 5a1 makes clear the outer edge 5e of the transmission part. Thus, even when the diameter of light flux incident on the aperture member 5 is set larger than the outer edge 5e of the transmission part 5b, the light flux incident on the aperture member 5 is restricted by the outer edge 5e of the transmission part 5b when passing through the transmission part 5b. The maximum diameter of the light flux emitted from the aperture member 5 is thus a diameter determined by the outer edge 5e of the transmission part 5b. Hence, when compared with an aperture member 5' described next, the diameter of light flux incident on the aperture member 5 need not be precisely matched with the outer edge 5e of the transmission part 5b.

Next, the aperture member 5' will now be described. As shown in FIG. 2B, the aperture member 5' has a light-shielding part 5'a1. In the aperture member 5', similar to the aperture member 5, the light-shielding part 5'a1 may be formed from an opaque member, for example, a metal plate. Alternatively, the light-shielding part 5'a1 may be formed from a transparent member, for example, a glass plate or a resin plate. The light-shielding part 5'a1 is formed, for example, by applying light-shielding paint on a glass plate.

The light-shielding part 5'a1 is formed so as to include the optical axis $AX_i$ of the illumination optical system. The shape of the light-shielding part 5'a1 is defined by a first outer edge 5'c and a second outer edge 5'd. Both ends of the first outer edge 5'c are connected to each other with the second outer edge 5'd. In FIG. 2B, the first outer edge 5'c is part of a circumference, and the second outer edge 5'd is a straight line. As indicated by the first outer edge 5'c and the second outer edge 5'd, the light-shielding part 5'a1 is shaped in the form of a circle with a cut-off segment, that is, a D-cut shape.

The shape of the transmission part 5'b is defined by an outer edge 5'e and an inner edge 5'f. Both ends of the outer edge 5'e are connected to each other with the inner edge 5'f. In FIG. 2B, the outer edge 5'e is part of a circumference, and the inner edge 5'f is a straight line. As indicated by the outer edge 5'e and the inner edge 5'f, the transmission part 5'b is shaped in the form of a circle with a cut-off segment, that is, a bow shape.

As described above, the shapes of the transmission part 5b and the transmission part 5'b are each a circle with a cut-off segment. Thus, it can be said that the transmission part 5b and the transmission part 5'b are both disposed asymmetrically with respect to the optical axis $AX_i$ of the illumination optical system.

When the aperture member 5' is formed from a metal plate, the transmission part 5'b does not physically exist. The outer edge of the transmission part 5'b therefore does not physically exist. When the aperture member 5' is formed from a transparent member, the transparent member is formed into the same shape as the light-shielding part 5'a1, so that the transmission part 5'b does not physically exist. The outer edge of the transmission part 5'b therefore does not physically exist.

In contrast, when the transparent member is formed into a circular shape, the transmission part 5'b physically exists. In this case, since the edge of the transparent member is the outer edge of the transmission part 5'b, the outer edge of the transmission part 5'b physically exists. However, since the transmission part 5'b is transparent, optically, substantially the same as when the aperture member 5' is formed from a metal plate. Therefore, even when the transparent member is formed into a circular shape, it is hard to say that the outer edge of the transmission part 5'b physically exists.

Accordingly, when the aperture member 5' is used, the diameter of light flux incident on the aperture member 5 is matched with the first outer edge 5'c. In this case, the outermost portion of the light flux comes to the outer edge of the transmission part 5'b. The inner edge of the transmission part 5'b is equivalent to the second outer edge 5'd. Based on the foregoing, the shape of the transmission part 5'b can be defined with the outermost portion of light flux and the second outer edge 5'd.

Referring back to FIG. 1, the description is continued. The aperture member 5 is conjugate to the light source 1. Therefore, the illumination light emitted from the light source 1 is collected at the position of the aperture member 5. That is, an image of the light source 1 is formed at the position of the aperture member 5.

Illumination light emitted from the aperture member 5 enters the condenser lens 4. Here, the position of the aperture member 5 coincides with the focal position of the condenser lens 4 (or the pupil position of the condenser lens 4). Therefore, the illumination light emitted from the condenser lens 4 becomes parallel light. Moreover, since a shape of the transmission part is an annular shape, a shape of the illumination light also is an annular shape. Therefore, the illumination light emitted from the condenser lens 4 is emitted so as to intersect with the optical axis of the observation optical system (the optical axis of the illumination optical system).

The illumination light emitted from the condenser lens 4 reaches a sample 7. The sample 7 is placed on a holding member 6. The sample 7 is a cell, for example, which is colorless and transparent.

The light passing through the sample 7, i.e., imaging light enters a microscope objective lens 8 (hereinafter, referred to as an "objective lens" as appropriate). This objective lens 8 is a microscope objective lens for bright-field observation, for example. Therefore, only a lens is present in the optical path of the objective lens 8, and no optical member to change the intensity or the phase of light, such as a phase plate or a modulation plate, is not present in the optical path.

The imaging light emitted from the objective lens 8 enters the imaging lens 10. Then, an image of the sample 7 is formed at an image position 11 by the imaging light emitted from the imaging lens 10.

As shown in FIG. 1, parallel light passing through the sample 7 is collected at a pupil 9 of the objective lens. As just described, the pupil 9 of the objective lens is conjugate to the aperture member 5. Therefore, an image of the aperture member 5 is formed at the position of the pupil 9 of the objective lens.

The relation between the pupil 9 of the objective lens and the image of the aperture member 5 will be described. In the following description, the aperture member 5 shown in FIG. 2A is used as an aperture member.

In the aperture member 5, the second outer edge 5d or the inner edge 5f is the boundary that separates the light-shielding part 5a1 from the transmission part 5b. The axis vertical to this boundary is defined as a first axis, and the axis parallel to the boundary is defined as a second axis. In FIG. 2, the first axis is the axis in the right-left direction in the drawing sheet, and the second axis is the axis in the top-bottom direction in the drawing sheet. In the following description, the first axis and the second axis are used for explanation.

Figure 3A:
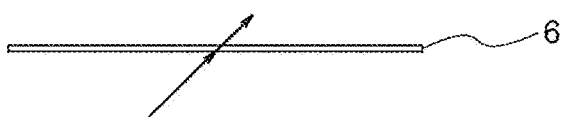
FIG. 3A, FIG. 3B, and FIG. 3C are diagrams showing the relation between the pupil of the objective lens and the image of the aperture member when no sample is present, where
Figure 3B:
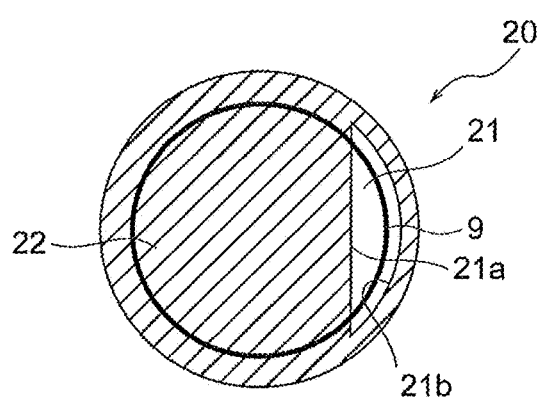
Figure 3C:
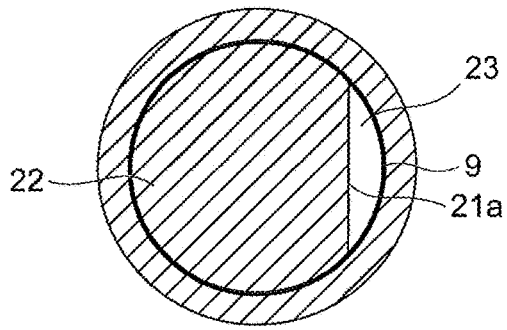

FIG. 3A, FIG. 3B, and FIG. 3C are diagrams showing the relation between the pupil of the objective lens and the image of the aperture member when no sample is present, where FIG. 3A is a diagram showing refraction of light at the sample position, FIG. 3B is a diagram showing the relation between the pupil of the objective lens and the image of the aperture member, and FIG. 3C is a diagram showing light flux passing through the pupil of the objective lens. The case in which no sample is present includes a case in which a sample is present but the surface of which is flat.

Figure 4A:
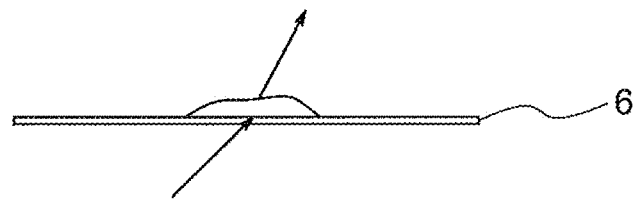
FIG. 4A, FIG. 4B, and FIG. 4C are diagrams showing the relation between the pupil of the objective lens and the image of the aperture member when a sample having a surface inclined upward to the right is present.
Figure 4B:
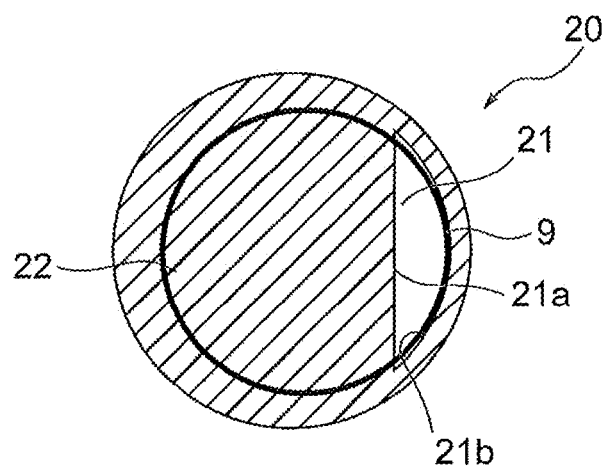
Figure 4C:
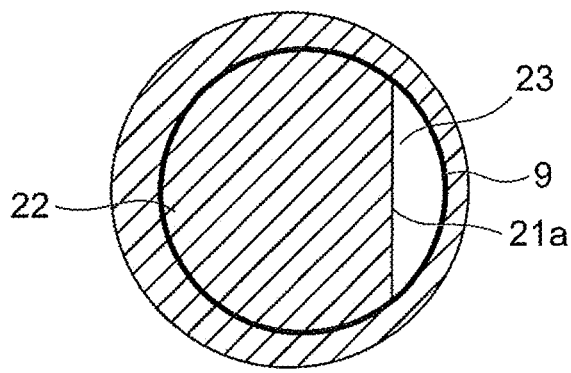

FIG. 4A, FIG. 4B, and FIG. 4C are diagrams showing the relation between the pupil of the objective lens and the image of the aperture member, in which a sample having a surface inclined upward to the right is present. FIG. 4A is a diagram showing refraction of light at the sample position, FIG. 4B is a diagram showing the relation between the pupil of the objective lens and the image of the aperture member, and FIG. 4C is a diagram showing light flux passing through the pupil of the objective lens. In FIG. 4, the inclination of the sample surface is upward to the right, that is, the sample surface is elevated from the left side to the right side of the first axis.

FIG. 5A, FIG. 5B, and FIG. 5C are diagrams showing the relation between the pupil of the objective lens and the image of the aperture member, in which a sample having a surface inclined downward to the right is present. FIG. 5A is a diagram showing refraction of light at the sample position, FIG. 5B is a diagram showing the relation between the pupil of the objective lens and the image of the aperture member, and FIG. 5C is a diagram showing light flux passing through the pupil of the objective lens. In FIG. 5, the inclination of the sample surface is downward to the right, that is, the sample surface is lowered from the left side to the right side of the first axis.

The term "a sample is present" means that the sample surface is inclined (not flat). The case in which a sample is present therefore does not include a case in which a sample is present but the surface of which is flat.

When no sample is present, as shown in FIG. 3A, light incident on the holding member 6 and light emitted from the holding member 6 have the same traveling direction. As a result, the image 20 of the aperture member formed at the pupil position of the objective lens is as shown in FIG. 3B. The circle (circumference) denoted by the reference sign 9 is the outer edge of the pupil of the objective lens, and the inside of the circle (circumference) is the pupil of the objective lens.

As shown in FIG. 3B, the image 21 of the transmission part is shaped like a bow, and the shape of the pupil 9 of the objective lens is a circle. Here, the image 21 of the transmission part is positioned so as to include part of the outer edge of the pupil 9 of the objective lens. The image 22 of the light-shielding part is positioned so as to cover the entire pupil 9 of the objective lens, except the region of the image 21 of the transmission part.

The image 21a of the inner edge of the transmission part is positioned inside of the outer edge of the pupil 9 of the objective lens (the direction toward the optical axis). The image 21b of the outer edge of the transmission part is positioned outside of the outer edge of the pupil 9 of the objective lens (the direction away from the optical axis). In this manner, in the sample observation device of the present embodiment, the image 21a of the inner edge of the transmission part is formed inside of the outer edge of the pupil 9 of the objective lens, and the image 21b of the outer edge of the transmission part is formed outside of the outer edge of the pupil 9 of the objective lens.

Here, light outside of the outer edge of the pupil 9 of the objective lens does not pass through the pupil 9 of the objective lens (does not exit the objective lens 8). The region 23 of the light flux passing through the pupil 9 of the objective lens is thus the region from the image 21a of the inner edge of the transmission part to the outer edge of the pupil 9 of the objective lens, as shown in FIG. 3C. The entire area of this region 23 corresponds to the brightness of the sample image.

Both ends of the image 21a of the inner edge of the transmission part are positioned outside of the outer edge of the pupil 9 of the objective lens. Therefore, the image 21a of the inner edge of the transmission part is not entirely positioned inside of the outer edge of the pupil 9 of the objective lens. However, most of the image 21a of the inner edge of the transmission part is positioned inside of the outer edge of the pupil 9 of the objective lens. Even in such a state, the image 21a of the inner edge of the transmission part is considered to be formed inside of the outer edge of the pupil 9 of the objective lens.

In contrast, when a sample is present, as shown in FIG. 4A and FIG. 5A, light incident on the holding member 6 and light emitted from the sample have different traveling directions.

In FIG. 4A, the sample surface is elevated from the left side to the right side of the first axis. Light emitted from the sample is deflected in the direction toward the optical axis. As a result, the image of the aperture member formed at the pupil position of the objective lens is as shown in FIG. 4B. Also in FIG. 4B, the circle (circumference) denoted by the reference sign 9 is the outer edge of the pupil of the objective lens, and the inside of the circle (circumference) is the pupil of the objective lens.

As shown in FIG. 4B, the image 21 of the transmission part is shaped like a bow, and the shape of the pupil 9 of the objective lens is a circle. Here, the image 21 of the transmission part is positioned so as to include part of the outer edge of the pupil 9 of the objective lens. The image 22 of the light-shielding part is positioned so as to cover the entire pupil of the objective lens, except the region of the image 21 of the transmission part.

The image 21a of the inner edge of the transmission part is positioned inside of the outer edge of the pupil 9 of the objective lens (the direction toward the optical axis). The image 21b of the outer edge of the transmission part is positioned outside of the outer edge of the pupil 9 of the objective lens (the direction away from the optical axis).

However, when compared with the case in which no sample is present, the image 20 of the aperture member is displaced leftward along the first axis with respect to the pupil 9 of the objective lens. Therefore, as shown in FIG. 4C, the distance from the image 21a of the inner edge of the transmission part to the outer edge of the pupil 9 of the objective lens is larger than that in FIG. 3C. In this case, the area of the region 23 is larger than the area of the region 23 in FIG. 3C. The brightness of the sample image in FIG. 4C is thus higher than the brightness of the sample image in FIG. 3C.

Light emitted from the sample comes close to the optical axis as the inclination of the sample surface becomes steep. In this case, the brightness of the sample image becomes high. Conversely, light emitted from the sample goes away from the optical axis as the inclination of the sample surface becomes gentle. In this case, the brightness of the sample image becomes low.

In FIG. 5A, the sample surface is lowered from the left side to the right side of the first axis. Light emitted from the sample is deflected in the direction away from the optical axis. As a result, the image of the aperture member formed at the pupil position of the objective lens is as shown in FIG. 5B. Also in FIG. 5B, the circle (circumference) denoted by the reference sign 9 is the outer edge of the pupil of the objective lens, and the inside of the circle (circumference) is the pupil of the objective lens.

As shown in FIG. 5B, the image 21 of the transmission part is shaped like a bow, and the shape of the pupil 9 of the objective lens is a circle. Here, the image 21 of the transmission part is positioned so as to include part of the outer edge of the pupil 9 of the objective lens. The image 22 of the light-shielding part is positioned so as to cover the entire pupil of the objective lens, except the region of the image 21 of the transmission part.

The image 21a of the inner edge of the transmission part is positioned inside of the outer edge of the pupil 9 of the objective lens (the direction toward the optical axis). The image 21b of the outer edge of the transmission part is positioned outside of the outer edge of the pupil 9 of the objective lens (the direction away from the optical axis).

However, when compared with the case in which no sample is present, the image 20 of the aperture member is displaced rightward along the first axis with respect to the pupil 9 of the objective lens. As shown in FIG. 5C, the distance from the image 21a of the inner edge of the transmission part to the outer edge of the pupil 9 of the objective lens is smaller than that in FIG. 3C. In this case, the area of the region 23 is smaller than the area of the region 23 in FIG. 3C. The brightness of the sample image in FIG. 5C is thus lower than the brightness of the sample image in FIG. 3C.

Light emitted from the sample goes away from the optical axis as the inclination of the sample surface becomes steep. In this case, the brightness of the sample image becomes low. Conversely, light emitted from the sample comes close to the optical axis as the inclination of the sample surface becomes gentle. In this case, the brightness of the sample image becomes high.

As described above, in the sample observation device 100, the brightness of the sample image differs between when a sample is present and when no sample is present. In addition, the brightness of the sample image changes depending on the direction of the inclination of the sample surface and the steepness of the inclination.

As just described, in the sample observation device of the present embodiment, a method for observing a sample, in which a sample is irradiated with a light flux having a predetermined width so as to intersect the optical axis of the objective lens, and the light flux having a predetermined width is asymmetric with respect to the optical axis of the objective lens, and the innermost light of the light flux having a predetermined width passes through the inside of the outer edge of the pupil of the objective lens, and the outermost light of the light flux having a predetermined width passes through the outside of the outer edge of the pupil of the objective lens, is used.

With this method, in the sample observation device of the present embodiment, a change in shape at the sample (change in inclination) is converted into a change of displacement of the image of the transmission part. Then, the change of displacement of the image of the transmission part causes a change in the amount of a light flux passing through the pupil of the objective lens. That is, the change in shape at the sample can be detected as a change in brightness. As a result, even when the sample is colorless and transparent, it is possible to obtain a sample image with shadow.

Further, in the sample observation device of the present embodiment, there is no need to use a modulator as in the modulation contrast method. Therefore, there is no need to perform positioning of the aperture member with reference to a modulator. As a result, the positioning of the aperture member can be simplified. Further, since no modulator is used, an objective lens for bright-field observation method can be used as the objective lens. Therefore, various observation methods (e.g., bright-field observation, fluorescent observation and polarization observation) can be performed easily with one objective lens.

Moreover, although the generated direction of shadow is determined by the position of the image 21 of the transmission part with respect to the pupil 9 of the objective lens, in the sample observation device of the present embodiment, since the position of the image 21 of the transmission part can be changed freely, the generated direction of shadow can be changed freely.

Moreover, the sample observation device of the present embodiment includes a light source, an optical system, and a holding member for holding an object, and the optical system includes a first optical system and a second optical system, and the first optical system and the second optical system are disposed to be opposed to each other with the holding member interposed therebetween, and the first optical system includes an aperture member, and the optical system is configured to form an image of a transmission part of the aperture member at a pupil position of the second optical system, and the image of the transmission part is decentered with respect to a pupil of the second optical system due to the refraction caused by the object, and a quantity of light passing through the pupil of the second optical system differs between in one direction and in another direction opposite to the one direction by the decentering, and the decentering in one direction increases the quantity of light passing through the pupil of the second optical system, and the decentering in the other direction reduces the quantity of light passing through the pupil of the second optical system.

As described above, in the sample observation device 100, the image 20 of the aperture member is decentered with respect to the pupil 9 of the objective lens depending on the shape of the sample, and there is a displacement between the image 20 and the pupil 9. When the image 20 of the aperture member is decentered to the right along the first axis, the brightness of the sample image decreases compared with the absence of decentering. When the image 20 of the aperture member is decentered to the left along the first axis, the brightness of the sample image increases compared with the absence of decentering.

Moreover, it is preferable that the sample observation device of the present embodiment includes an illumination optical system and an observation optical system, and the illumination optical system includes a light source, a condenser lens, and an aperture member, and the observation optical system includes an objective lens and an imaging lens, and the aperture member has a light-shielding part, and a shape of the light-shielding part is defined by a first outer edge and a second outer edge, and the first outer edge is part of a perimeter of a predetermined shape, and the predetermined shape is a shape rotational symmetric with respect to an optical axis of the illumination optical system, and both ends of the first outer edge are connected to each other with the second outer edge, and the image of the second outer edge is formed inside of an outer edge of a pupil of the objective lens, and the image of the first outer edge is formed outside of the outer edge of the pupil of the objective lens.

As for the shape of the light-shielding part, in the light-shielding part 5a1 and the light-shielding part 5'a1, the first outer edge 5c and the first outer edge 5'c can be considered to be part of the perimeter of a predetermined shape. Here, the predetermined shape is a shape rotational symmetric with respect to the optical axis $AX_i$ of the illumination optical system. Examples of the predetermined shape include circles and regular polygons. In FIG. 2, the predetermined shape is a circle, and the first outer edge 5c and the first outer edge 5'c are both arcs.

Both ends of the first outer edge 5c are connected to each other with the second outer edge 5d. The first outer edge 5'c is connected with the second outer edge 5'd. The second outer edge 5d and the second outer edge 5'd are both straight lines.

In contrast, in the transmission part 5b, the outer edge 5e is part of the perimeter of the predetermined shape and is a part excluding the first outer edge 5c from the perimeter of the predetermined shape. In the transmission part 5'b, the outer edge 5'e is part of the perimeter of the predetermined shape and is a part excluding the first outer edge 5'c from the perimeter of the predetermined shape. In FIG. 2, the predetermined shape is a circle, and the outer edge 5e and the outer edge 5'e are both arcs.

Moreover, the image 22 of the light-shielding part shown in FIG. 3B can be divided into two, in the same manner as the light-shielding part 5a1 and the light-shielding part 5a2 shown in FIG. 2A. As described above, the light-shielding part 5a1 is defined by the first outer edge 5c and the second outer edge 5d. As for the image of the light-shielding part 5a1 in the image 22 of the light-shielding part, the image of the second outer edge 5d is formed inside of the outer edge of the pupil 9 of the objective lens, and the image of the first outer edge 5c is formed outside of the outer edge of the pupil 9 of the objective lens. As a result, the image of the light-shielding part 5a1 is formed so as to include part of the outer edge of the pupil 9 of the objective lens.

As described above, a change of the displacement of the image of the transmission part with respect to the pupil of the objective lens causes a change in the amount of light flux passing through the pupil of the objective lens. That is, a change in shape at the sample can be detected as a change in brightness. Here, the displacement of the transmission part is also the displacement of the light-shielding part. Thus, the image of the light-shielding part 5a1 is formed so as to include part of the outer edge of the pupil 9 of the objective lens, whereby a change in shape at the sample can be detected as a change in brightness.

Moreover, the aperture member for a sample observation device including an objective lens of the present embodiment is disposed in the illumination optical system of the sample observation device and includes a light-shielding part or a darkening part, and a transmission part, and the transmission part is disposed asymmetrically with respect to the optical axis of the illumination optical system, and the transmission part is formed such that the image of the inner edge of the transmission part is formed inside of the outer edge of the pupil of the objective lens and that the image of the outer edge of the transmission part is formed outside of the outer edge of the pupil of the objective lens.

When the aperture member for a sample observation device including an objective lens is applied to a sample observation device, the objective lens can be irradiated with illumination light asymmetric with respect to the optical axis thereof. In addition, since the image of the inner edge of the transmission part is formed inside of the outer edge of the pupil of the objective lens, and the image of the outer edge of the transmission part is formed outside of the outer edge of the pupil of the objective lens, a change in shape at the sample can be detected as a change in brightness.

Moreover, in the sample observation device of the present embodiment, it is preferable that the following conditional expression (1) is satisfied:

$$L_0 \times \beta < R_{ob} < L_1 \times \beta \quad (1),$$

where $L_0$ is the length from the optical axis of the illumination optical system to a predetermined position, $L_1$ is the length from the optical axis of the illumination optical system to the outer edge of the transmission part, on the line connecting the optical axis of the illumination optical system with the predetermined position, the predetermined position is a position, in which the length from the optical axis of the illumination optical system is made minimum, from among positions on the inner edge of the transmission part, $R_{ob}$ is the radius of the pupil of the objective lens, and $\beta$ is a value obtained by dividing the focal length of the objective lens by the focal length of the condenser lens.

When the conditional expression (1) is satisfied, a change in shape at the sample can be detected as a change in brightness. As a result, even when the sample is colorless and transparent, it is possible to obtain a sample image with shadow.

Figure 6A:
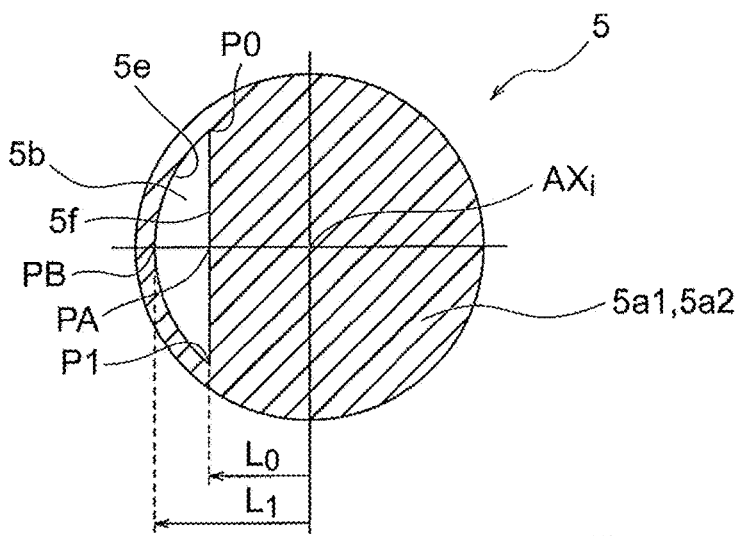
FIG. 6A, FIG. 6B, and FIG. 6C are diagrams for explaining $L_0$, $L_1$ and $R_{ob}$, where
Figure 6B:
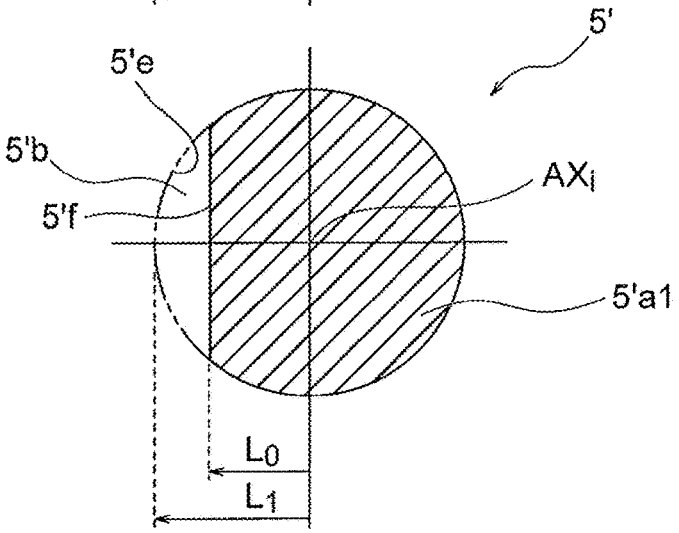
Figure 6C:
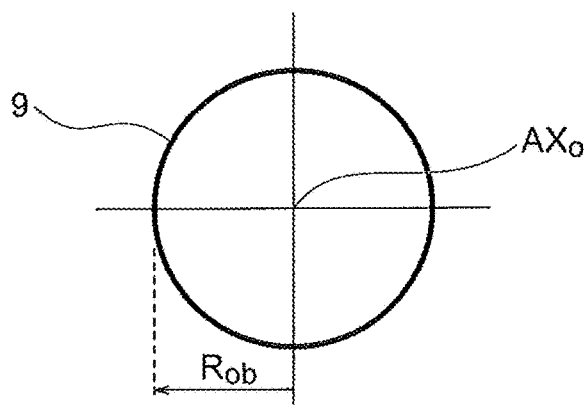

Referring to FIG. 6A, FIG. 6B, and FIG. 6C, $L_0$, $L_1$ and $R_{ob}$ will be described. FIG. 6A, FIG. 6B, and FIG. 6C are diagrams for explaining $L_0$, $L_1$ and $R_{ob}$, where FIG. 6A is a diagram showing $L_0$ and $L_1$ in an aperture member, FIG. 6B is a diagram showing $L_0$ and $L_1$ in another aperture member, and FIG. 6C is a diagram showing $R_{ob}$ in the pupil of the objective lens.

FIG. 6A is a diagram showing $L_0$ and $L_1$ in the aperture member 5. The aperture member 5 has the light-shielding part 5a1, the light-shielding part 5a2, and the transmission part 5b. The light-shielding part 5a1 and the light-shielding part 5a2 in FIG. 6A integrally show the light-shielding part 5a1 and the light-shielding part 5a2 in FIG. 2A.

Moreover, a point P0 is one end of the inner edge 5f, and a point P1 is the other end of the inner edge 5f. The point P0 and the point P1 are also one end and the other end, respectively, of the outer edge 5e.

The transmission part 5b is shaped like a bow. In the transmission part 5b, the line passing through the point P0, a point PA, and the point P1 is the inner edge 5f. When the distances from the optical axis $AX_i$ of the illumination optical system to the points on the inner edge 5f are compared, the point PA is the point having the shortest distance from the optical axis $AX_i$ of the illumination optical system. Thus, the point PA is the predetermined position. As a result, the length from the optical axis $AX_i$ of the illumination optical system to the point PA is $L_0$.

Moreover, in the transmission part 5b, the line passing through the point P0, a point PB, and the point P1 is the outer edge 5e. Since the point PA is the predetermined position as described above, the line connecting the optical axis $AX_i$ of the illumination optical system with the point PA is the line connecting the optical axis $AX_i$ of the illumination optical system with the predetermined position. This line is extended to intersect the outer edge 5e. The point PB is positioned both on the line connecting the optical axis $AX_i$ of the illumination optical system with the predetermined position and on the outer edge 5e. As a result, the length from the optical axis $AX_i$ of the illumination optical system to the point PB is $L_1$.

FIG. 6B is a diagram showing $L_0$ and $L_1$ in the aperture member 5'. The aperture member 5' has the light-shielding part 5'a1 and the transmission part 5'b. The transmission part 5'b is shaped like a bow, in the same manner as in the transmission part 5b, and a detailed description of $L_0$ and $L_1$ will be omitted.

In the aperture member 5', the outer edge 5'e may physically not exist, as described above. In such a case, the outer edge 5'e can be replaced by the outermost position of light flux. Alternatively, the outer edge 5'e can be replaced by the extension of the outer edge of the light-shielding part 5'a1, for example, the extension of the first outer edge 5'c in FIG. 2B. Moreover, the inner edge 5'f can be replaced by the second outer edge 5'd in FIG. 2B.

As just described, the outer edge of the transmission part corresponds to the first outer edge of the light-shielding part, and the inner edge of the transmission part corresponds to the second outer edge of the light-shielding part. Thus, it can be said that $L_0$ is the minimum length from among lengths from the optical axis of the illumination optical system to the second outer edge, and that $L_1$ is the length from the optical axis of the illumination optical system to the first outer edge.

FIG. 6C is a diagram showing $R_{ob}$ in the pupil 9 of the objective lens. $R_{ob}$ is the radius of the pupil 9 of the objective lens and is the distance from the optical axis $AX_o$ of the observation optical system to the outer edge of the pupil 9 of the objective lens.

Figure 7A:
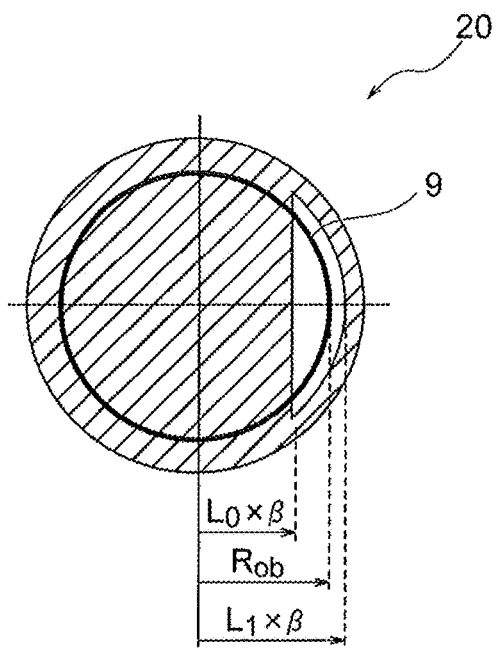
FIG. 7A and FIG. 7B are diagrams showing the relation between the pupil of the objective lens and the image of the aperture member, where
Figure 7B:
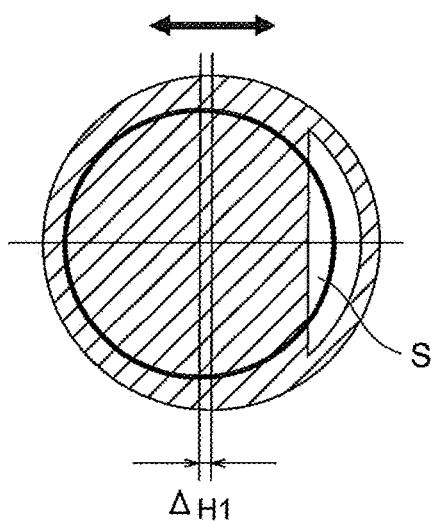

FIG. 7A and FIG. 7B are diagrams showing the relation between the pupil of the objective lens and the image of the aperture member, where FIG. 7A is a diagram showing the image of the aperture member not displaced with respect to the pupil of the objective lens, and FIG. 7B is a diagram showing the image of the aperture member displaced in the direction along the first axis with respect to the pupil of the objective lens.

The optical system is disposed between the aperture member and the pupil of the objective lens, whereby the image 20 of the aperture member is formed at the position of the pupil 9 of the objective lens. The size of the image 20 of the aperture member is determined by the magnification of the optical system. When the optical system includes a condenser lens and an objective lens, the magnification β of the optical system is a value obtained by dividing the focal length of the objective lens by the focal length of the condenser lens.

As shown in FIG. 7A, the relation among $L_0$, $L_1$ and $R_{ob}$ is such that $L_0 \times \beta < R_{ob}$ and $R_{ob} < L_1 \times \beta$. In a case in which $L_0 \times \beta < R_{ob}$ is satisfied, the image of the inner edge of the transmission part is formed inside of the outer edge of the pupil of the objective lens. In addition, when $R_{ob} < L_1 \times \beta$ is satisfied, the image of the outer edge of the transmission part is formed outside of the outer edge of the pupil of the objective lens.

As shown in FIG. 7B, when the image 20 of the aperture member is displaced with respect to the pupil 9 of the objective lens, the position of the image of the transmission part changes with respect to the pupil 9 of the objective lens. The direction in which the image 20 of the aperture member is displaced is determined by the shape of the sample. Thus, as shown by the arrow, the image 20 of the aperture member can be displaced leftward in some cases and can be displaced rightward in other cases along the first axis. In FIG. 7B, the image 20 of the aperture member is displaced leftward along the first axis with respect to the pupil 9 of the objective lens.

As described above, the position of the image 20 of the aperture member with respect to the pupil 9 of the objective lens, that is, the position of the image of the transmission part changes depending on the shape of the sample. When the position of the image of the transmission part changes, light passing through the pupil 9 of the objective lens changes. As a result, a change in shape at the sample can be detected as a change in brightness.

In FIG. 7B, the center of the image of the aperture member is displaced leftward along the first axis with respect to the center of the pupil of the objective lens. The displacement amount is denoted by $\Delta_{H1}$, and the region (area) of light flux passing through the pupil of the objective lens is denoted by S. In FIG. 7B, the combination of the image of the light-shielding part and the image of the transmission part is shaped like a circle. In such a case, a displacement of the image of the transmission part is equal to a displacement of the center of the image of the aperture member with respect to the center of the pupil of the objective lens. Thus, the displacement amount $\Delta_{H1}$ in FIG. 7B is also the displacement amount of the image of the transmission part.

In FIG. 7B, when the displacement amount $\Delta_{H1}$ is changed, the area S also changes. The displacement amount $\Delta_{H1}$ is then changed to obtain the area S. The results are shown below.

FIG. 8A, FIG. 8B, FIG. 8C, and FIG. 8D are diagrams showing the relation of displacement of the image of the aperture member with respect to the pupil of the objective lens and the relation between the displacement amount $\Delta_{H1}$ and the amount of light flux I, where FIG. 8A is a graph showing the relation between the displacement amount $\Delta_{H1}$ and the amount of light flux I. FIG. 8B and FIG. 8D are diagrams showing a case where the displacement of the image of the aperture member occurs, and FIG. 8C is a diagram showing a case where no displacement of the image of the aperture member occurs. Here, the displacement amount $\Delta_{H1}$ is the displacement amount of the image of the aperture member with respect to the pupil of the objective lens in a direction along the first axis, and the amount of light flux I is the amount of light flux passing through the pupil of the objective lens.

In FIG. 8B, FIG. 8C, and FIG. 8D, the image of the aperture member moves in the direction of the arrow in the order of FIG. 8B, FIG. 8C, and FIG. 8D with respect to the pupil of the objective lens. The direction in which the image of the aperture member is displaced is the direction along the first axis.

In FIG. 8A, the calculation is based on $L_0 \times \beta = 0.8 \times R_{ob}$ and $L_1 \times \beta = 1.1 \times R_{ob}$. The transmittance of the transmission part is set to 100%. In FIG. 8A, the numerical values on the horizontal axis are obtained by normalizing the displacement amount $\Delta_{H1}$ by the radius $R_{ob}$ of the pupil of the objective lens. The numerical values on the vertical axis are normalized by the area when the displacement amount $\Delta_{H1}$ is zero:

$$S_0 = R_{ob}^2 \times \theta - R_{ob} \times L_0 \times \beta \times \sin\theta,$$

where $\theta = \cos^{-1}(L_0 \times \beta / R_{ob})$.

The area S indicates the region of light flux passing through the pupil of the objective lens. Thus, the area S can be replaced by the amount of light flux I. Then in FIG. 8A, I is used as a variable of the vertical axis.

When no sample is present (or when the sample surface is flat), the displacement amount $\Delta_{H1}$ is zero. In this case, the relation between the pupil of the objective lens and the image of the aperture member is as represented by B (FIG. 8C). Thus, the amount of light flux I is the amount denoted by the arrow B.

Next, when a sample is present, the displacement amount $\Delta_{H1}$ is not zero. Here, when the sample surface is elevated from the left side to the right side of the first axis, the relation between the pupil of the objective lens and the image of the aperture member is as represented by A (FIG. 8B). In this case, of the region of the image of the transmission part, the region positioned within the pupil of the objective lens is smaller than that of when the displacement amount $\Delta_{H1}$ is zero. The amount of light flux I is thus the amount denoted by the arrow A.

In contrast, when the sample surface is lowered from the left side to the right side of the first axis, the relation between the pupil of the objective lens and the image of the aperture member is as represented by C (FIG. 8D). In this case, of the region of the image of the transmission part, the region positioned within the pupil of the objective lens is larger than that of when the displacement amount $\Delta_{H1}$ is zero. The amount of light flux I is thus the amount denoted by the arrow C.

As just described, in the sample observation device of the present embodiment, the amount of light flux I changes depending on a change of the displacement amount $\Delta_{H1}$. Thus, according to the sample observation device of the present embodiment, a change in shape at the sample can be detected as a change in brightness. As a result, even when the sample is colorless and transparent, it is possible to obtain a sample image with shadow.

In FIG. 7, a state in which the image of the aperture member is displaced in a direction along the first axis is shown. However, the image of the aperture member is displaced in various directions depending on the shape of the sample. An example of the direction of displacementing is a direction along the second axis.

Figure 9A:
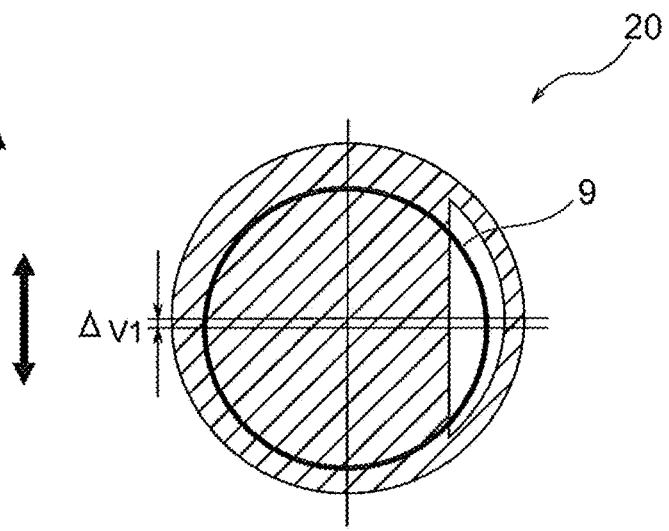
FIG. 9A and FIG. 9B are diagrams showing the image of the aperture member displaced in the direction along a second axis.
Figure 9B:
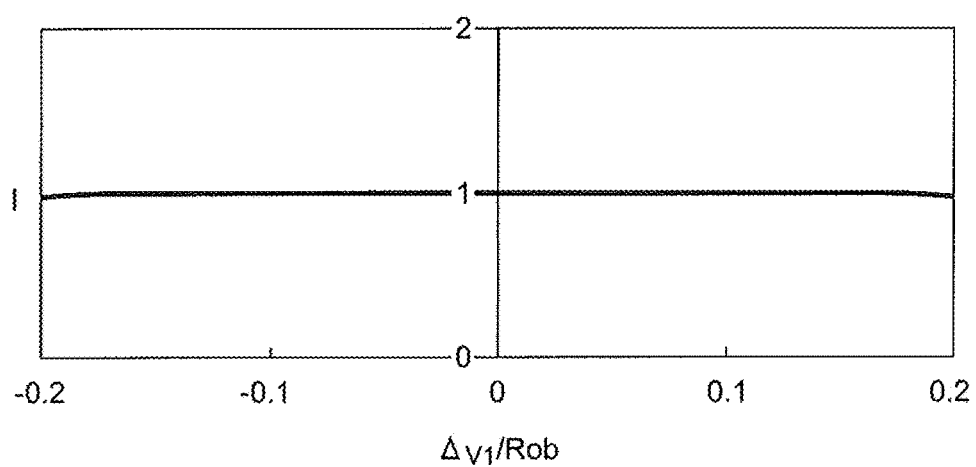

The image of the aperture member displaced in a direction along the second axis will be described with reference to FIG. 9A and FIG. 9B. FIG. 9A and FIG. 9B are diagrams showing the image of the aperture member displaced in the direction along the second axis, where FIG. 9A is a diagram showing the image of the aperture member displaced with respect to the pupil of the objective lens, and FIG. 9B is a graph showing the relation between a displacement amount $\Delta_{V1}$ and the amount of light flux I. Here, the displacement amount $\Delta_{V1}$ is the displacement amount of the image of the aperture member with respect to the pupil of the objective lens in the direction along the second axis, and the amount of light flux I is the amount of light flux passing through the pupil of the objective lens.

In FIG. 9A, the image 20 of the aperture member is displaced in the direction along the second axis with respect to the pupil 9 of the objective lens. Here, the displacement amount is denoted by $\Delta_{V1}$, and the region (area) of light flux passing through the pupil of the objective lens is denoted by S. In FIG. 9A, the combination of the image of the light-shielding part and the image of the transmission part is shaped like a circle. In such a case, a displacement of the image of the transmission part is equal to a displacement of the center of the image of the aperture member with respect to the center of the pupil of the objective lens. Thus, the displacement amount $\Delta_{V1}$ in FIG. 9A is also the displacement amount of the image of the transmission part.

In FIG. 9A, when the displacement amount $\Delta_{V1}$ is changed, the area S also changes. The displacement amount $\Delta_{V1}$ is then changed to obtain the area S. The results are shown in FIG. 9B. As can be understood from the graph in FIG. 9B, when the image of the aperture member is displaced in the direction along the second axis, a change of the amount of light flux I is little.

As just described, in the case of the transmission part shaped like a bow, when the image of the aperture member is displaced in the direction along the first axis, the amount of light flux passing through the pupil of the objective lens changes to a large degree. When the image of the aperture member is displaced in the direction along the second axis, a change of the amount of light flux passing through the pupil of the objective lens is little.

Thus, according to the sample observation device of the present embodiment, a change in shape at the sample can be detected as a change in brightness. As a result, even when the sample is colorless and transparent, it is possible to obtain a sample image with shadow. It is noted that the generated direction of shadow is determined by the position of the transmission part at the pupil position of the objective lens. That is, the generated direction of shadow are produced is limited.

In the sample observation device of the present embodiment, it is preferable that a line indicating a boundary between the light-shielding part or the darkening part and the transmission part is a straight line.

With this configuration, when the image of the aperture member is displaced in the direction along the first axis, the quantity of light changes. When the image of the aperture member is displaced in the direction along the second axis, a change of the quantity of light is suppressed.

In order to further reduce a change of the quantity of light in displacementing in the direction along the second axis, it is preferable that a line indicating a boundary between the light-shielding part or the darkening part and the transmission part is a single straight line extending in one direction.

Using another aperture member, the relation between the displacement amount of the image of the aperture member with respect to the pupil of the objective lens and the amount of light flux passing through the pupil of the objective lens will be described. Another aperture member is an aperture member in a first modification and has a transmission part having a shape different from the shape of the transmission part 5b.

Figure 10A:
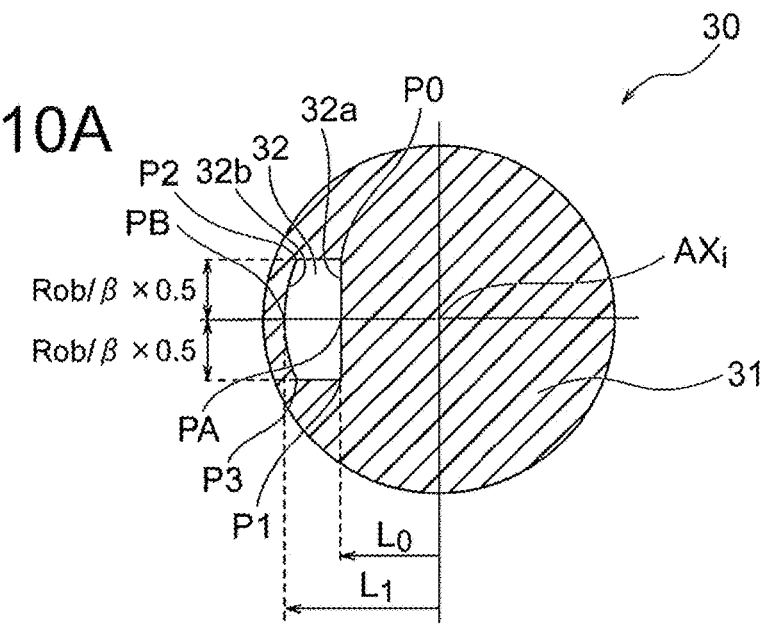
FIG. 10A and FIG. 10B are diagrams showing the configuration of an aperture member in a first modification, where
Figure 10B:
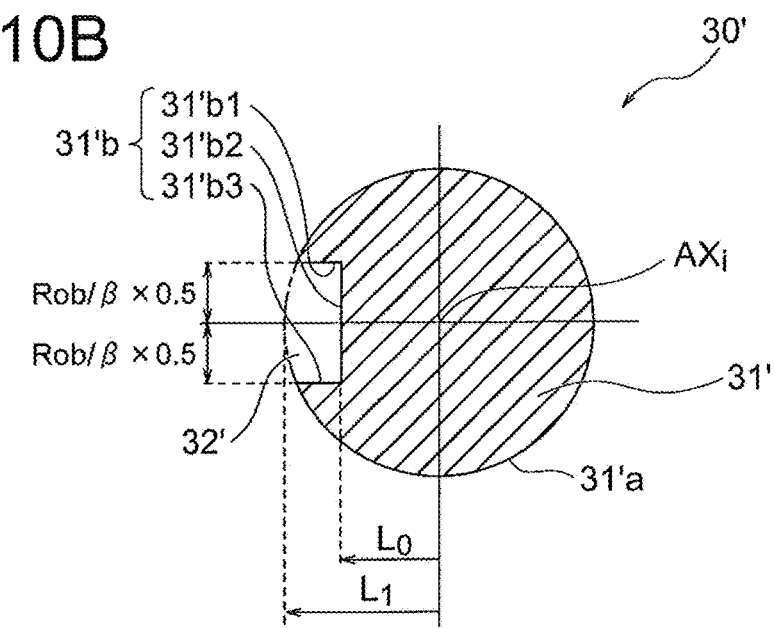

FIG. 10A and FIG. 10B are diagrams showing a configuration of the aperture member in the first modification, where FIG. 10A is a diagram showing an aperture member having a light-shielding part formed on the outside of the transmission part. FIG. 10B is a diagram showing an aperture member not having a light-shielding part on the outside of the transmission part. A darkening part may be used in place of the light-shielding part. $L_0$ and $L_1$ in an aperture member 30 are shown in FIG. 10A, and $L_0$ and $L_1$ in an aperture member 30' are shown in FIG. 10B.

As shown in FIG. 10A, the aperture member 30 has a light-shielding part 31 and a transmission part 32. The light-shielding part 31 includes two light-shielding parts in the same manner as in FIG. 2A, but the two light-shielding parts are shown integrally.

The light-shielding part 31 is formed with a ring light-shielding part and a light-shielding part positioned in the inside of the ring. The ring light-shielding part has the same shape as the light-shielding part 5a2 in FIG. 2A. The light-shielding part 31 positioned in the inside of the ring has the same shape as the shape of the light-shielding part 31' shown in FIG. 10B. Moreover, the light-shielding part positioned in the inside of the ring is formed so as to include the optical axis $AX_i$ of the illumination optical system. The transmission part 32 is shaped like a comb.

As shown in FIG. 10B, the aperture member 30' has a light-shielding part 31'. The light-shielding part 31' is formed so as to include the optical axis $AX_i$ of the illumination optical system. The shape of the light-shielding part 31' is formed by cutting off the comb-shaped region from a circle. The aperture member 30' will be described later.

Referring to FIG. 10A, $L_0$ and $L_1$ will be described. In the transmission part 32, the line passing through the point P0, the point PA, and the point P1 is the inner edge 32a. Here, when the distances from the optical axis $AX_i$ of the illumination optical system to the points on the inner edge 32a are compared, the point PA is the point having the shortest distance from the optical axis $AX_i$ of the illumination optical system. Thus, the point PA is the predetermined position. As a result, the length from the optical axis $AX_i$ of the illumination optical system to the point PA is $L_0$.

Moreover, in the transmission part 32, the line passing through the point P2, the point PB, and the point P3 is an outer edge 32b. Since the point PA is the predetermined position as described above, the line connecting the optical axis $AX_i$ of the illumination optical system with the point PA is the line connecting the optical axis $AX_i$ of the illumination optical system with the predetermined position. When this line is extended, the extended line intersects the outer edge 32b. Here, the point PB is positioned both on the line connecting the optical axis $AX_i$ of the illumination optical system with the predetermined position and on the outer edge 32b. As a result, the length from the optical axis $AX_i$ of the illumination optical system to the point PB is $L_1$.

Moreover, in the transmission part 32, the length from the point P0 to the point PA and the length from the point PA to the point P1 are both set to $R_{ob}/\beta \times 0.5$.

Figure 11A:
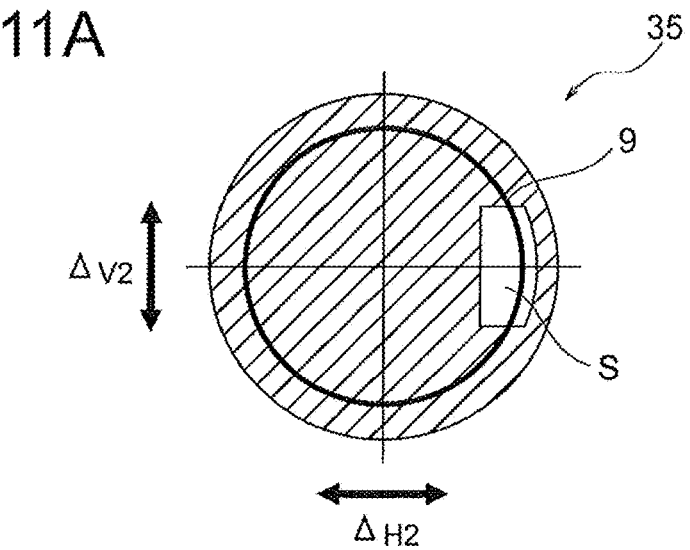
FIG. 11A, FIG. 11B, and FIG. 11C are diagrams showing the relation between the pupil of the objective lens and the image of the aperture member in the first modification, where
Figure 11B:
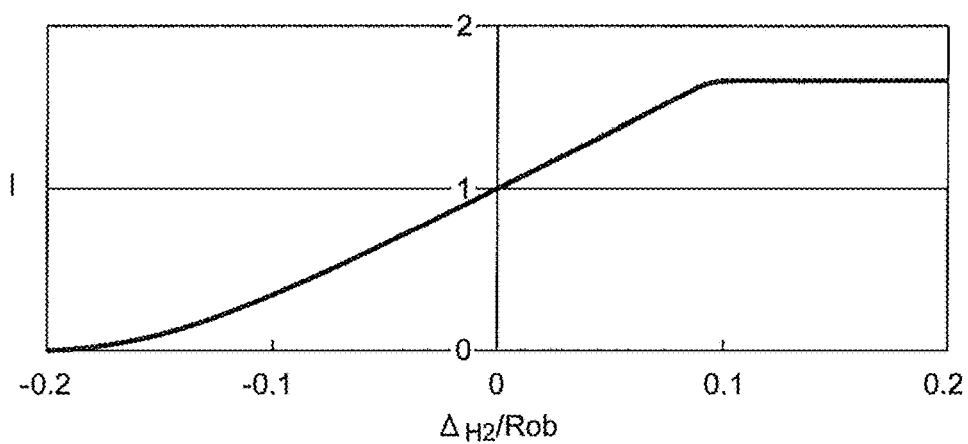
Figure 11C:
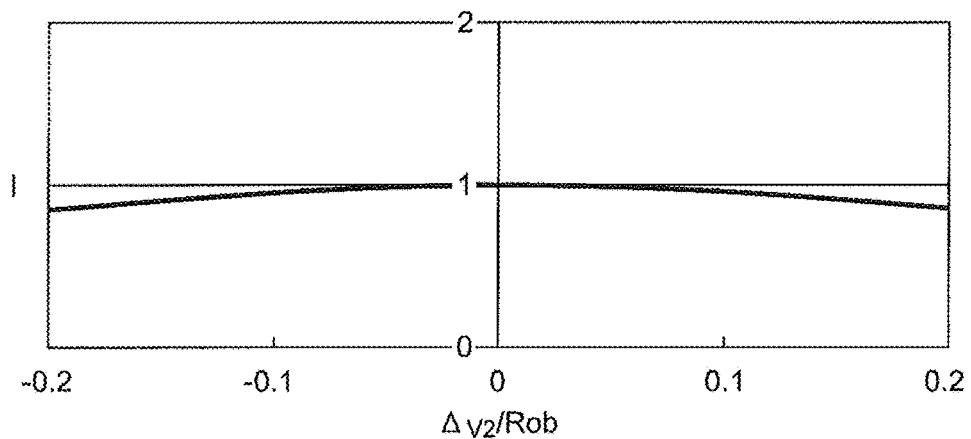

The relation between the pupil of the objective lens and the image of the aperture member in the first modification will be described with reference to FIG. 11A, FIG. 11B, and FIG. 11C. FIG. 11A, FIG. 11B, and FIG. 11C are diagrams showing the relation between the pupil of the objective lens and the image of the aperture member in the first modification, where FIG. 11A is a diagram showing the direction in which the image of the aperture member in the first modification is displaced with respect to the pupil of the objective lens, FIG. 11B is a graph showing the relation between a displacement amount $\Delta_{H2}$ and the amount of light flux I, and FIG. 11C is a graph showing the relation between a displacement amount $\Delta_{V2}$ and the amount of light flux I. Here, both the displacement amount $\Delta_{H2}$ and the displacement amount $\Delta_{V2}$ are the displacement amount of the image of the aperture member in the first modification with respect to the pupil of the objective lens, where the displacement amount $\Delta_{H2}$ is the displacement amount in the direction along the first axis, and the displacement amount $\Delta_{V2}$ is the displacement amount in the direction along the second axis, and The amount of light flux I is the amount of light flux passing through the pupil of the objective lens.

When the image 35 of the aperture member is displaced with respect to the pupil 9 of the objective lens, the position of the image of the transmission part changes with respect to the pupil 9 of the objective lens. The direction, in which the image 35 of the aperture member is displaced, is determined by the shape of the sample. Thus, the image 35 of the aperture member is displaced, for example, in the direction along the first axis or the direction along the second axis, as shown by the arrows.

As described above, the position of the image 35 of the aperture member with respect to the pupil 9 of the objective lens, that is, the position of the image of the transmission part changes depending on the shape of the sample. When the position of the image of the transmission part changes, light passing through the pupil 9 of the objective lens changes. As a result, a change in shape at the sample can be detected as a change in brightness.

In FIG. 11A, the displacement amount in the right-left direction along the first axis is denoted by $\Delta_{H2}$, the displacement amount in the top-bottom direction along the second axis is denoted by $\Delta_{V2}$, and the region (area) of light flux passing through the pupil of the objective lens is denoted by S. In FIG. 11A, the combination of the image of the light-shielding part and the image of the transmission part is shaped like a circle. In such a case, a displacement of the image of the transmission part is equal to a displacement of the center of the image of the aperture member with respect to the center of the pupil of the objective lens. Thus, the displacement amount $\Delta_{H2}$ or the displacement amount $\Delta_{V2}$ in FIG. 11A is also the displacement amount of the transmission part.

In FIG. 11A, when the displacement amount $\Delta_{H2}$ or the displacement amount $\Delta_{V2}$ is changed, the area S also changes. The displacement amount $\Delta_{H2}$ or the displacement amount $\Delta_{V2}$ is then changed to obtain the area S. The results are shown in FIG. 11B and FIG. 11C. The area S indicates the range of light flux passing through the pupil of the objective lens. Thus, the area S can be replaced by the amount of light flux I. Then in FIG. 11B and FIG. 11C, I is used as a variable of the vertical axis.

When the image 35 of the aperture member is displaced in the direction along the first axis, the change of the amount of light flux is as illustrated in the graph in FIG. 11B. As just described, when the aperture member 30 is used, the amount of light flux I changes in accordance with a change of the displacement amount $\Delta_{H2}$, in the same manner as when the aperture member 5 is used.

In contrast, when the image 35 of the aperture member is displaced in the direction along the second axis, the change of the amount of light flux is as illustrated in the graph in FIG. 11C. When the aperture member 30 is used, the amount of light flux I changes in accordance with a change of the displacement amount $\Delta_{V2}$, to a greater than that of when the aperture member 5 is used. However, the change of the amount of light flux I is smaller than when the displacement amount is $\Delta_{H2}$.

As described above, the aperture members 5, 5' 30, 30' are used such that the image of the transmission part includes part of the outer edge of the pupil of the objective lens as described above, whereby a change in shape at the sample can be detected as a change in brightness. As a result, even when the sample is colorless and transparent, it is possible to obtain sample image with shadow. It is noted that the generated direction of shadow is determined by the position of the transmission part at the pupil position of the objective lens. That is, the generated direction of shadow is limited.

As described above, in the sample observation device of the present embodiment, shadows are generated by using the pupil of the objective lens. Here, the aperture member is disposed in the illumination optical system. Then, by rotating the aperture member about the optical axis of the illumination optical system, it is possible to rotate the image of the transmission part about the optical axis of the observation optical system, at the pupil position of the objective lens. As a result, the image of the transmission part moves on the circumference.

In contrast, the shape of the pupil of the objective lens is a circle. Then, the image of the transmission part is set to always include part of the outer edge of the pupil of the objective lens. With this configuration, even when the image of the transmission part moves, the image of the transmission part always includes the outer edge of the pupil of the objective lens. Thus, the generated direction of shadow can be changed freely only by rotating the aperture member about the optical axis of the illumination optical system.

Figure 12A:
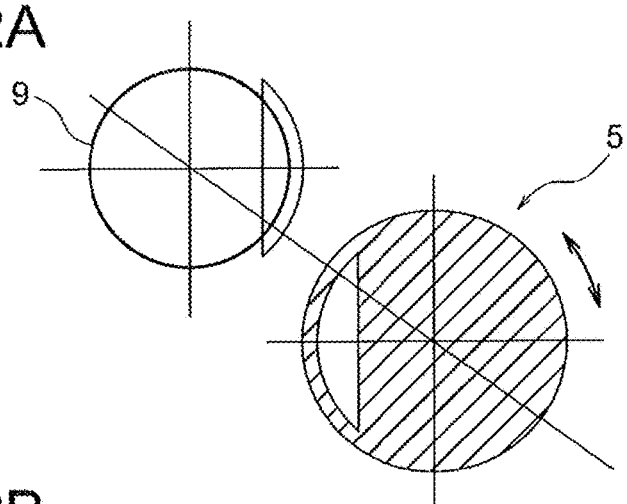
FIG. 12A, FIG. 12B, and FIG. 12C are diagrams showing the relation between the position of the transmission part and the position of the image of the transmission part at the pupil position of the objective lens, where
Figure 12B:
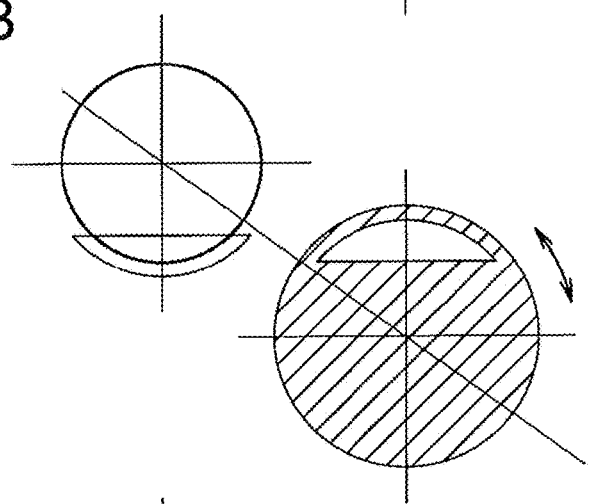
Figure 12C:
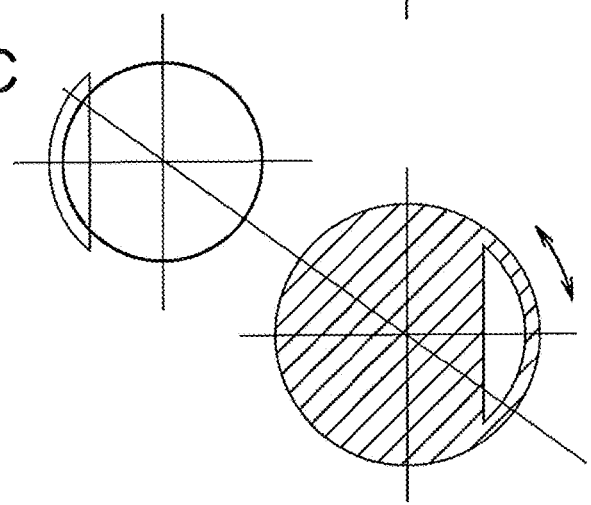

FIG. 12A, FIG. 12B, and FIG. 12C are diagrams showing the relation between the position of the transmission part and the position of the image of the transmission part at the pupil position of the objective lens, where FIG. 12A is a diagram showing the transmission part positioned leftward in the first axis, FIG. 12B is a diagram showing the transmission part positioned upward in the second axis, and FIG. 12C shows the transmission part positioned rightward in the first axis.

The position of the transmission part is changed by rotating the aperture member 5 about the optical axis of the illumination optical system. When the position of the transmission part is changed, the position of the image of the transmission part at the position of the pupil 9 of the objective lens also changes. It is noted that wherever the transmission part is positioned, the image of the transmission part always includes the outer edge of the pupil of the objective lens.

As just described, in the sample observation device of the present embodiment, the generated direction of shadow can be changed freely only by rotating the aperture member about the optical axis of the illumination optical system.

Figure 13A:
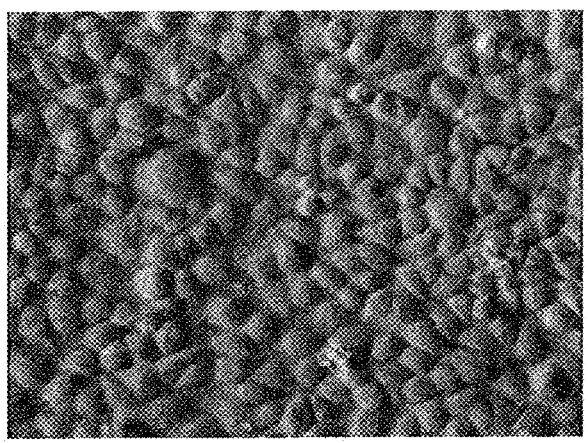
FIG. 13A, FIG. 13B, and FIG. 13C are electronic images of cells, where
Figure 13B:
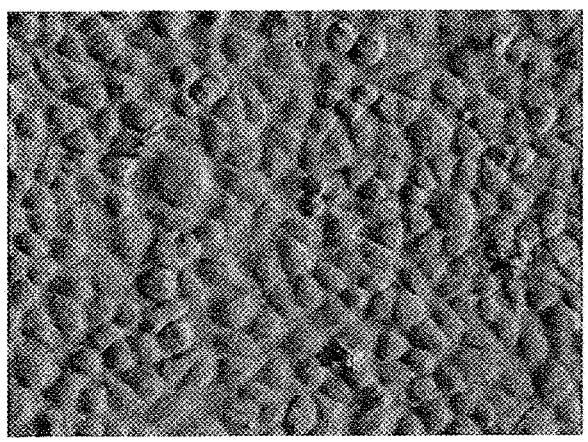
Figure 13C:
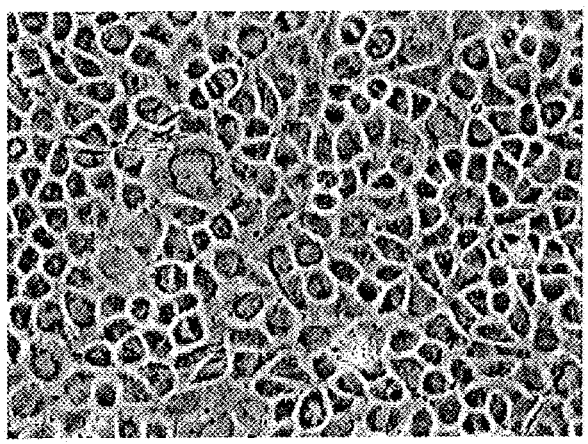

Examples of observation results in the sample observation device of the present embodiment are shown in FIG. 13. FIG. 13A, FIG. 13B, and FIG. 13C are electronic images of cells, where FIG. 13A is an electronic image when the transmission part is positioned at the position shown in FIG. 12A, FIG. 13B is an electronic image when the transmission part is positioned at the position shown in FIG. 12C, and FIG. 13C is an electronic image obtained by the phase contrast method. As shown in FIG. 13A and FIG. 13B, according to the sample observation device of the present embodiment, the outline or internal structure of colorless transparent cells can be observed clearly.

Moreover, in the sample observation device of the present embodiment, it is preferable that the following conditional expression (2) is satisfied:

$$0 \leq (L_0 \times \beta)/R_{ob} < 1 \qquad (2),$$

where $L_0$ is the length from the optical axis of the illumination optical system to a predetermined position, the predetermined position is a position, in which the length from the optical axis of the illumination optical system is made minimum, from among positions on the inner edge of the transmission part, $R_{ob}$ is the radius of the pupil of the objective lens, and $\beta$ is a value obtained by dividing the focal length of the objective lens by the focal length of the condenser lens.

When falling below a lower limit value of conditional expression (2), the distance from the image of the inner edge of the transmission part to the outer edge of the pupil of the objective lens is too long. In this case, the amount of light flux passing through the pupil of the objective lens is unlikely to differ between when the displacement amount $\Delta_H$ is zero and when displacement amount $\Delta_H$ is not zero. Therefore, it is difficult to detect a change in shape at the sample as a change in brightness. As a result, it is difficult to obtain a sample image with shadow, or the contrast of the sample image is insufficient.

When exceeding an upper limit value of conditional expression (2), the image of the transmission part is always positioned on the outside of the pupil of the objective lens. Thus, a change in shape at the sample cannot be detected as a change in brightness. The upper limit value of Conditional Expression (2) is therefore not to be exceeded.

The displacement amount $\Delta_H$ is the displacement amount in the direction along the first axis, for example, $\Delta_{H1}$ in FIG. 7B or $\Delta_{H2}$ in FIG. 11A.

It is preferable that the following conditional expression (2') is satisfied instead of conditional expression (2):

$$0.2 \leq (L_0 \times \beta)/R_{ob} < 1 \qquad (2').$$

It is more preferable that the following conditional expression (2") is satisfied instead of conditional expression (2):

$$0.4 \leq (L_0 \times \beta)/R_{ob} < 1 \qquad (2").$$

Moreover, in the sample observation device of the present embodiment, it is preferable that the following conditional expression (3) is satisfied:

$$1 < (L_1 \times \beta)/R_{ob} \leq 2 \qquad (3)$$

where $L_1$ is the length from the optical axis of the illumination optical system to the outer edge of the transmission part, on the line connecting the optical axis of the illumination optical system with a predetermined position, the predetermined position is a position, in which the length from the optical axis of the illumination optical system is made minimum, from among positions on the inner edge of the transmission part, $R_{ob}$ is the radius of the pupil of the objective lens, and $\beta$ is a value obtained by dividing the focal length of the objective lens by the focal length of the condenser lens.

When falling below a lower limit value of conditional expression (3), the image of the transmission part is positioned in the inside of the pupil of the objective lens. Therefore, it is thus difficult to detect a change in shape at the sample as a change in brightness. Therefore, falling below the lower limit value of Conditional Expression (3) does not occur.

By making so as not to exceed an upper limit value of conditional expression (3), light flux passing through the outside of the effective aperture of the objective lens can be reduced. Thus, generation of flares and ghosts can be prevented.

It is preferable that the following conditional expression (3') is satisfied instead of conditional expression (3):

$$1<(L_1\times\beta)/R_{ob}\le 1.6 \qquad (3').$$

It is more preferable that the following conditional expression (3") is satisfied instead of Conditional Expression (3):

$$1<(L_1\times\beta)/R_{ob}\le 1.3 \qquad (3").$$

In Conditional Expressions (2), (2') and (2"), the upper limit value is preferably set to 0.99, more preferably 0.98. In Conditional Expressions (3), (3') and (3"), the lower limit value is preferably set to 1.01, more preferably 1.05.

Moreover, in the sample observation device of the present embodiment, it is preferable that the following conditional expression (4) is satisfied:

$$0.2<(R_{ob}-L_0\times\beta)/(L_1\times\beta-R_{ob})<10 \qquad (4),$$

where $L_0$ is the length from the optical axis of the illumination optical system to a predetermined position, $L_1$ is the length from the optical axis of the illumination optical system to the outer edge of the transmission part, on the line connecting the optical axis of the illumination optical system with the predetermined position, the predetermined position is a position, in which the length from the optical axis of the illumination optical system is made minimum, from among positions on the inner edge of the transmission part, $R_{ob}$ is the radius of the pupil of the objective lens, and $\beta$ is a value obtained by dividing the focal length of the objective lens by the focal length of the condenser lens.

By satisfying Conditional Expression (4), if the image of the aperture member is displaced in the direction along the first axis, the amount of change in quantity of light is almost the same when the displacement is leftward and when the displacement is rightward. That is, the change in quantity of light when the displacement is leftward is symmetric to the change in quantity of light when the displacement is rightward.

In the sample observation device of the present embodiment, it is preferable that the area of the image of the light-shielding part or the area of the image of the darkening part at the pupil position of the objective lens is 50% or more of the area of the pupil of the objective lens.

With this configuration, a change in brightness in the sample image can be detected in accordance with the direction of the inclination of the sample surface and the steepness of the inclination. As a result, even when the sample is colorless and transparent, it is possible to obtain a sample image with shadow. Moreover, the aforementioned ratio of the area is preferably the ratio obtained when the image of the aperture member is not displaced.

When light blocking of 50% or more or light reduction of 50% or more is not available, light flux passing through the pupil of the objective lens is large at a time of the absence of displacementing of the image of the aperture member. In this case, the amount of light flux passing through the pupil of the objective lens is unlikely to differ between when the image of the aperture member is displaced and when the image is not displaced. It is thus difficult to detect a change in shape at the sample as a change in brightness. As a result, it is difficult to obtain a sample image with shadow, or the contrast of the sample image is insufficient.

The area of the image of the light-shielding part or the darkening part at the pupil position of the objective lens is preferably 65% or more of the area of the pupil of the objective lens, more preferably 80% or more.

Moreover, in the sample observation device of the present embodiment, it is preferable that the following conditional expression (5) is satisfied:

$$0.1<S_{in}/S_{all}<1 \qquad (5),$$

where $S_{all}$ is the area of the image of the transmission part, and
$S_{in}$ is the area of a part of the image of the transmission part that is positioned inside of the outer edge of the pupil of the objective lens.

The area of the image of the transmission part is the area of the image at the pupil position of the objective lens. When conditional expression (5) is satisfied, a change in shape at the sample can be detected as a change in brightness. As a result, even when the sample is colorless and transparent, it is possible to obtain a sample image with shadow.

It is preferable that the following conditional expression (5') is satisfied instead of conditional expression (5):

$$0.2<S_{in}/S_{all}<0.9 \qquad (5').$$

It is more preferable that the following conditional expression (5") is satisfied instead of conditional expression (5):

$$0.3<S_{in}/S_{all}<0.8 \qquad (5").$$

Returning to FIG. 10B, the aperture member 30' will be described. The aperture member 30' has a light-shielding part 31'. The shape of the light-shielding part 31' is defined by a first outer edge 31'*a* and second outer edges 31'*b*. The first outer edge 31'*a* is part of the perimeter of a predetermined shape. The predetermined shape is a circle, and the first outer edge 31'*a* is an arc.

Both ends of the first outer edge 31'*a* are connected with each other with the second outer edges 31'*b*. The second outer edges 31'*b* includes a first line segment 31'*b*1, a second line segment 31'*b*2, and a third line segment 31'*b*3. The first line segment 31'*b*1, the second line segment 31'*b*2, and the third line segment 31'*b*3 are all straight lines.

One end of the first line segment 31'*b*1 is connected with one end of the first outer edge 31'*a*. The other end of the first line segment 31'*b*1 is connected with one end of the second line segment 31'*b*2. Moreover, the other end of the second line segment 31'*b*2 is connected with one end of the third line segment 31'*b*3. The other end of the third line segment 31'*b*3 is connected with the other end of the first outer edge 31'*a*.

In contrast, at a transmission part 32', an outer edge is part of the perimeter of a predetermined shape, which is a part excluding the first outer edge 31'*a* from the perimeter of the predetermined shape. Since the predetermined shape is a circle, the outer edge of the transmission part 32' is an arc. The transmission part 32' is shaped like a comb.

The transmission part 32' is shaped like a circle with a cut-off segment. Based on these, the transmission part 32' is disposed asymmetrically with respect to the optical axis $AX_i$ of the illumination optical system.

Figure 14A:
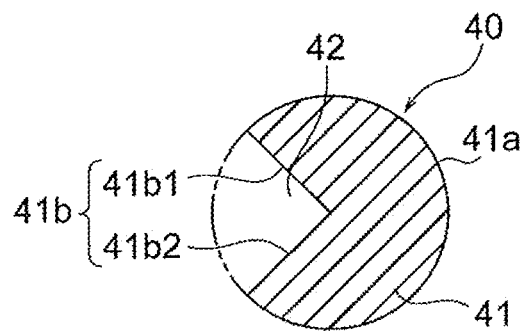
FIG. 14A, FIG. 14B, FIG. 14C, FIG. 14D, and FIG. 14E show modifications of the aperture member, where
Figure 14B:
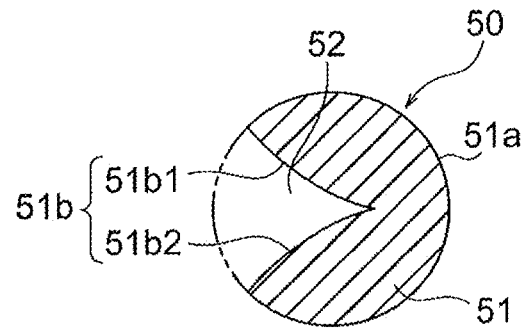
Figure 14C:
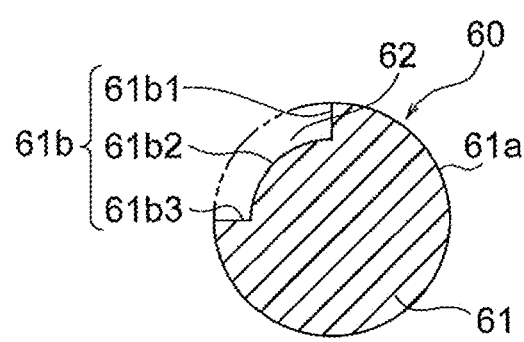
Figure 14D:
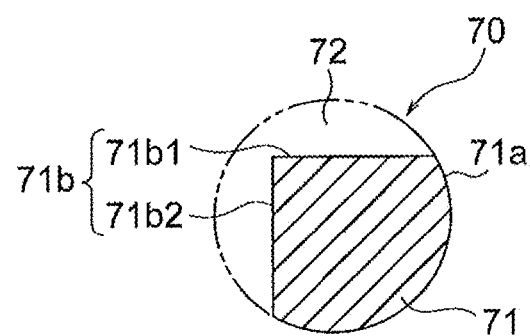
Figure 14E:
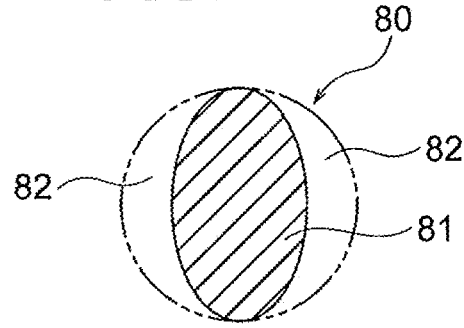

FIG. 14A, FIG. 14B, FIG. 14C, FIG. 14D, and FIG. 14E show modifications of the aperture member. In FIG. 14A, FIG. 14B, FIG. 14C, FIG. 14D, and FIG. 14E, FIG. 14A is a diagram showing the aperture member in a second modification, FIG. 14B is a diagram showing the aperture member in a third modification, FIG. 14C is a diagram showing the aperture member in a fourth modification, FIG. 14D is a diagram showing the aperture member in a fifth modification, and FIG. 14E is a diagram showing the aperture member in a sixth modification. In these modifications, the shapes of the transmission parts are different from each other. A darkening part may be used in place of the light-shielding part.

As shown in FIG. 14A, an aperture member 40 in the second modification has a light-shielding part 41. The shape of the light-shielding part 41 is defined by a first outer edge 41a and second outer edges 41b. The first outer edge 41a is part of the perimeter of a predetermined shape. The predetermined shape is a circle, and the first outer edge 41a is an arc.

Both ends of the first outer edge 41a are connected with each other with the second outer edges 41b. The second outer edges 41b include a first line segment 41b1 and a second line segment 41b2. The first line segment 41b1 and the second line segment 41b2 are both straight lines.

One end of the first line segment 41b1 is connected with one end of the first outer edge 41a. The other end of the first line segment 41b1 is connected with one end of the second line segment 41b2. Moreover, the other end of the second line segment 41b2 is connected with the other end of the first outer edge 41a. The other end of the first line segment 41b1 and one end of the second line segment 41b2 are connected at the center of the predetermined shape.

In contrast, at a transmission part 42, an outer edge is part of the perimeter of a predetermined shape, which is a part excluding the first outer edge 41a from the perimeter of the predetermined shape. Since the predetermined shape is a circle, the outer edge of the transmission part 42 is an arc. The shape of the transmission part 42 is a sector.

As shown in FIG. 14B, an aperture member 50 in the third modification has a light-shielding part 51. The shape of the light-shielding part 51 is defined by a first outer edge 51a and second outer edges 51b. The first outer edge 51a is part of the perimeter of a predetermined shape. The predetermined shape is a circle, and the first outer edge 51a is an arc.

Both ends of the first outer edge 51a are connected with each other with the second outer edges 51b. The second outer edges 51b include a first line segment 51b1 and a second line segment 51b2. The first line segment 51b1 and the second line segment 51b2 are both curved lines.

One end of the first line segment 51b1 is connected with one end of the first outer edge 51a. The other end of the first line segment 51b1 is connected with one end of the second line segment 51b2. Moreover, the other end of the second line segment 51b2 is connected with the other end of the first outer edge 51a. The other end of the first line segment 41b1 and one end of the second line segment 41b2 are connected at a point off the center of the predetermined shape.

In contrast, at a transmission part 52, an outer edge is part of the perimeter of a predetermined shape, which is a part excluding the first outer edge 51a from the perimeter of the predetermined shape. Since the predetermined shape is a circle, the outer edge of the transmission part 52 is an arc. The transmission part 52 is shaped like a ginkgo leaf.

As shown in FIG. 14C, an aperture member 60 in the fourth modification has a light-shielding part 61. The shape of the light-shielding part 61 is defined by a first outer edge 61a and second outer edges 61b. The first outer edge 61a is part of the perimeter of a predetermined shape. The predetermined shape is a circle, and the first outer edge 61a is an arc.

Both ends of the first outer edge 61a are connected with each other with the second outer edges 61b. The second outer edges 61b include a first line segment 61b1, a second line segment 61b2, and a third line segment 61b3. The first line segment 61b1 and the third line segment 61b3 are both straight lines, and the second line segment 61b2 is a curved line.

One end of the first line segment 61b1 is connected with one end of the first outer edge 61a. The other end of the first line segment 61b1 is connected with one end of the second line segment 61b2. Moreover, the other end of the second line segment 61b2 is connected with one end of the third line segment 61b3. The other end of the third line segment 61b3 is connected with the other end of the first outer edge 61a. The other end of the first line segment 61b1 and one end of the second line segment 61b2 are connected at a point off the center of the predetermined shape. Moreover, the other end of the second line segment 61b2 and one end of the third line segment 61b3 are connected at a point off the center of the predetermined shape.

In contrast, at a transmission part 62, an outer edge is part of the perimeter of a predetermined shape, which is a part excluding the first outer edge 61a from the perimeter of the predetermined shape. Since the predetermined shape is a circle, the outer edge of the transmission part 62 is an arc. The transmission part 62 is shaped like an arched bridge.

As shown in FIG. 14D, an aperture member 70 in the fifth modification has a light-shielding part 71. The shape of the light-shielding part 71 is defined by a first outer edge 71a and second outer edges 71b. The first outer edge 71a is part of the perimeter of a predetermined shape. The predetermined shape is a circle, and the first outer edge 71a is an arc.

Both ends of the first outer edge 71a are connected with each other with the second outer edges 71b. The second outer edges 71b include a first line segment 71b1 and a second line segment 71b2. The first line segment 71b1 and the second line segment 71b2 are both straight lines.

One end of the first line segment 71b1 is connected with one end of the first outer edge 71a. The other end of the first line segment 71b1 is connected with one end of the second line segment 71b2. The other end of the second line segment 71b2 is connected with the other end of the first outer edge 71a. The other end of the first line segment 71b1 and one end of the second line segment 71b2 are connected at a point off the center of the predetermined shape.

In contrast, at a transmission part 72, an outer edge is part of the perimeter of a predetermined shape, which is a part excluding the first outer edge 71a from the perimeter of the predetermined shape. Since the predetermined shape is a circle, the outer edge of the transmission part 72 is an arc. The shape of the transmission part 72 is the letter L.

As shown in FIG. 14E, an aperture member 80 in the sixth modification has a light-shielding part 81. The shape of the light-shielding part 81 is an oval. The circumference of the oval serves as a first outer edge and a second outer edge. In transmission parts 82, the outer edges form a circle. The shape of each transmission part 82 is like a crescent.

The shapes of the transmission parts 42, 52, 62, and 72 are each a circle with a cut-off segment. In this regard, these transmission parts are disposed asymmetrically with respect to the optical axis $AX_i$ of the illumination optical system.

Moreover, in the aperture members 40, 50, 60, and 70, the transmission part is disposed asymmetrically with respect to the optical axis $AX_i$ of the illumination optical system. Thus, the brightness of the image gradually increases, for example, as the image of the transmission part is displaced with respect to the pupil of the objective lens from the right to the left along the first axis.

Moreover, the shape of the aperture member 80 positioned at 0 degree agrees with the shape rotated by 180 degrees. The arrangement therefore may not be asymmetric with respect to the optical axis $AX_j$. However, the shape does not agree at positions rotated by angles other than 180 degrees. Thus, the brightness of the image gradually increases, for example, as the image of the transmission part is displaced with respect to the pupil of the objective lens from the right to the left in the drawing sheet along the first axis.

In the aperture members shown in the second to sixth modifications, there is nothing on the outside of the light-shielding part. However, a light-shielding part may be additionally provided outside the light-shielding part, in the same manner as in the aperture member 5 or the aperture member 30.

Figure 15A:
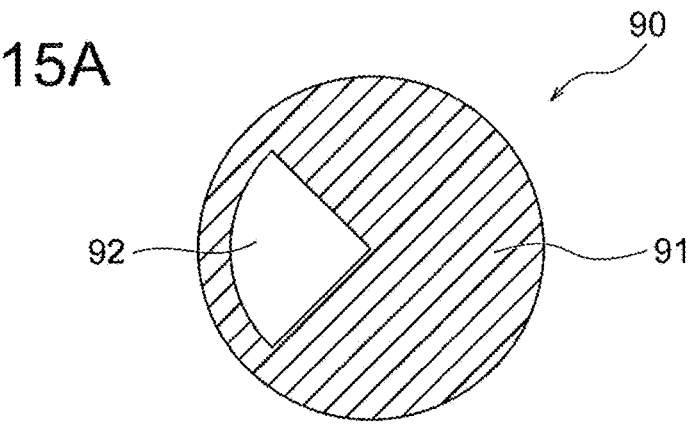
FIG. 15A, FIG. 15B, and FIG. 15C show various examples of the aperture member having a transmission part with the similar outline, where
Figure 15B:
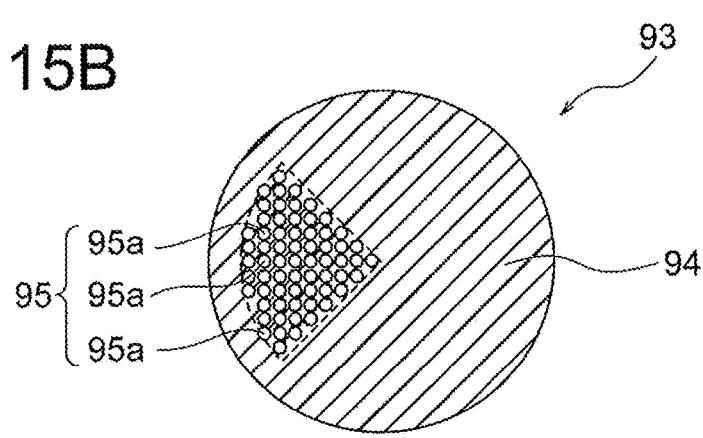
Figure 15C:
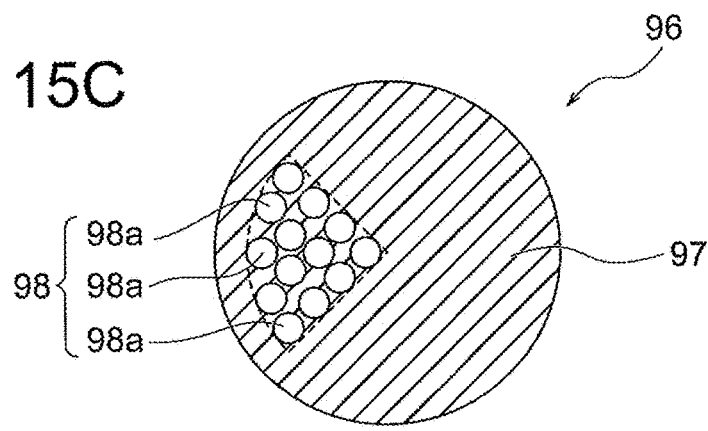

In FIG. 14A, FIG. 14B, FIG. 14C, FIG. 14D, and FIG. 14E, aperture members having transmission parts in various shapes are shown. Next, aperture members having transmission parts of the same shape will now be described with reference to FIG. 15A, FIG. 15B, and FIG. 15C. FIG. 15A, FIG. 15B, and FIG. 15C show various examples of the aperture member having a transmission part with the similar outline, where FIG. 15A is a diagram showing an aperture member having a light-shielding part and an additional light-shielding part provided outside of a transmission part. FIG. 15B is a diagram showing an aperture member having a plurality of transmission parts. FIG. 15C is a diagram showing an aperture member having a plurality of light sources disposed in a transmission part.

FIG. 15A is a diagram showing an aperture member having a light-shielding part and an additional light-shielding part provided outside of a transmission part. An aperture member 90 includes a light-shielding part 91 and a transmission part 92. The transmission part 92 is formed by providing an additional ring light-shielding part on the outside of the light-shielding part 41 of the aperture member 40.

As just described, the provision of an additional light-shielding part outside the light-shielding part 41 makes clear the outer edge of the transmission part 92. Thus, even when the diameter of light flux incident on the aperture member 90 is larger than that of the outer edge of the transmission part 92, the light flux incident on the aperture member 90 is restricted by the outer edge of the transmission part 92 when passing through the aperture member 90. Therefore, the maximum diameter of light flux exiting the aperture member 90 is determined by the outer edge of the transmission part 92. As a result, when compared with the aperture member 40 described below, the diameter of light flux incident on the aperture member 90 need not be precisely matched with the outer edge of the transmission part 92.

In the sample observation device of the present embodiment, it is preferable that the light-shielding part has a characteristic of blocking light in a predetermined wavelength range.

In the aperture members 5 and 5' shown in FIG. 2, light emitted from the light source is blocked by the light-shielding parts 5$a$1 and 5'$a$1. Here, the light-shielding parts 5$a$1 and 5'$a$1 block light of all wavelengths. Therefore, when the aperture member 5, 5' is used, a shadow image alone is obtained.

Then, the light-shielding parts 5$a$1 and 5'$a$1 are provided with a characteristic of blocking light in a predetermined wavelength range. For this purpose, in the light-shielding parts 5$a$1 and 5'$a$1, a multilayer optical film is formed, for example. The multilayer optical film, for example, transmits light having a wavelength range of green light and reflects light of other wavelengths. A description will be given using the aperture member 5.

As illumination light, for example, light having a wavelength range of red light is incident on the aperture member 5. In this case, red light is transmitted through the transmission part 5$b$ but reflected by the light-shielding part 5$a$1. As a result, red light in the form of a ring exits the condenser lens 4.

The red light emitted from the condenser lens 4 reaches the pupil 9 of the objective lens, and an image of the transmission part 5$b$ is formed there. Here, the image of the inner edge of the transmission part 5$b$ is formed inside of the outer edge of the pupil 9 of the objective lens, and the image of the outer edge of the transmission part 5$b$ is formed outside of the outer edge of the pupil 9 of the objective lens. Therefore, the same function effects described with reference to FIG. 3 to FIG. 5 are achieved also when the aperture member 5 is used.

As a result, in the sample observation device of the present embodiment, a change in shape at the sample (change of inclination) is converted into a change of displacement of the image of the transmission part. The change of displacement of the image of the transmission part causes a change in the amount of light flux passing through the pupil of the objective lens. That is, a change in shape at the sample can be detected as a change in brightness. As a result, even when the sample is colorless and transparent, it is possible to obtain a sample image with shadow.

In contrast, as illumination light, for example, light having a wavelength range of green light is incident on the aperture member 5. In this case, green light is transmitted through both of the transmission part 5$b$ and the light-shielding part 5$a$1. As a result, circular green light emitted from the condenser lens 4. The shape of green light emitted from the condenser lens 4 is the same as the shape of illumination light in bright-field observation. Using light having the green wavelength range of green light thus enables bright-field observation.

In order to obtain light having a predetermined wavelength range as illumination light, an optical filter that allows light having a predetermined wavelength range to pass through is disposed between the white light source and the condenser lens. Alternatively, a plurality of LEDs having different in light emission wavelength range are disposed, and one of the LEDs may be made LEDs which emits light having a predetermined wavelength range.

As just described, according to the sample observation device of the present embodiment, observation with a shadow image and observation with a bright-field image can be performed by changing the wavelengths of illumination light.

Moreover, in the sample observation device of the present embodiment, it is preferable that the aperture member is formed from an opaque member, and the transmission part has a plurality of openings formed in the opaque member. Here, the openings may be minute openings. The diameters of the openings or the minute openings may be equal or different. The arrangement of the openings or the minute openings may be random or regular.

FIG. 15B is a diagram showing an aperture member having a plurality of transmission parts. As shown in FIG. 15B, an aperture member 93 has a light-shielding part 94 and a transmission part 95. The light-shielding part 94 is an opaque member, for example, a metal plate.

As shown in FIG. 15B, the transmission part 95 includes a plurality of minute openings 95a. The minute openings 95a are voids (holes) formed in a metal plate. The minute openings 95a can be formed by irradiating a metal plate with laser. In FIG. 15B, the diameters of the minute openings 95a are equal.

With this configuration, the transmission part can be readily formed. Moreover, it is possible to obtain transmission parts having various transmittances by changing the diameters and/or the density of the minute openings.

Although in FIG. 15B, the minute openings 95a are positioned regularly, the minute openings 95a may be positioned randomly. Alternatively, a plurality of minute openings 95a may be set as a group, and the group may be repeatedly arranged in a particular pattern. Although in FIG. 15B, the minute openings 95a are arranged in nine rows, the minute openings may be arranged in more than nine rows or less than nine rows.

Moreover, the diameters of the minute openings may vary. With this configuration, it is possible to form the transmission part with changing transmittances easily. Moreover, by changing the diameters and/or the density of the minute openings, the degree of change in transmittance can be changed in various ways.

Moreover, in the sample observation device of the present embodiment, it is preferable that a plurality of light sources are included, and the plurality of light sources are disposed in the transmission part. In this case, the light source 1 and the lenses 2, 3 in FIG. 1 can be omitted.

FIG. 15C is a diagram showing a configuration of the aperture member including a plurality of light sources are disposed in the transmission part. As shown in FIG. 15C, an aperture member 96 has a light-shielding part 97 and a transmission part 98. The light-shielding part 97 and the transmission part 98 are formed from a transparent member, for example, a glass plate. The light-shielding part 97 is formed, for example, by applying light-shielding paint on a glass plate.

In contrast, a plurality of light sources 98a, for example, LEDs are disposed in the transmission part 98. In FIG. 15C, the plurality of LEDs are arranged in the shape of an arc in four rows. With this configuration, the size (width) of the transmission part can be changed by changing the number of rows for emitting light. In addition, it is possible to vary the transmittance of the transmission part varies with the position by changing the brightness of the LEDs.

In short, the sample observation device of the present embodiment is a device which includes an illumination optical system and an observation optical system, and the illumination optical system includes a plurality of light sources and a condenser lens, and the observation optical system includes an objective lens and an imaging lens, and images of inner edges of the light sources are formed inside of an outer edge of a pupil of the objective lens, and images of outer edges of the light sources are formed outside of an outer edge of the pupil of the objective lens.

Moreover, an LED may be disposed also in the light-shielding part 97. Illumination can be performed in accordance with the observation method, by turning on and off the LED disposed in the light-shielding part 97.

Figure 16A:
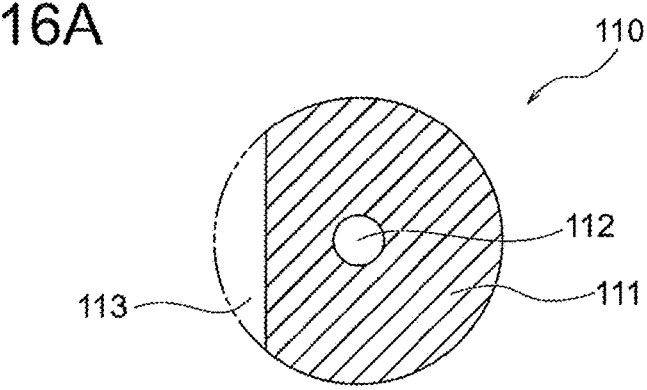
FIG. 16A, FIG. 16B, and FIG. 16C are diagrams each showing an aperture member having a plurality of transmission parts different in shape, where
Figure 16B:
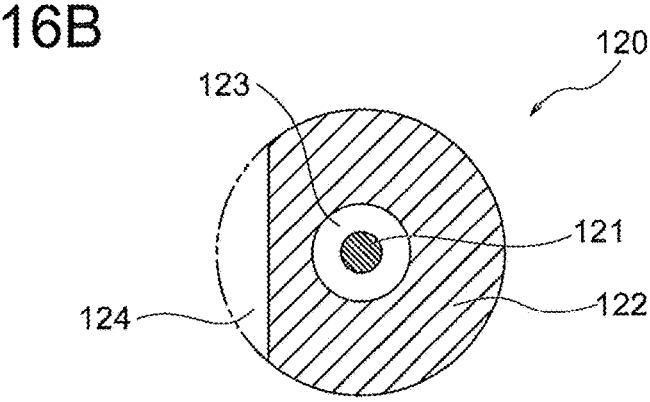
Figure 16C:
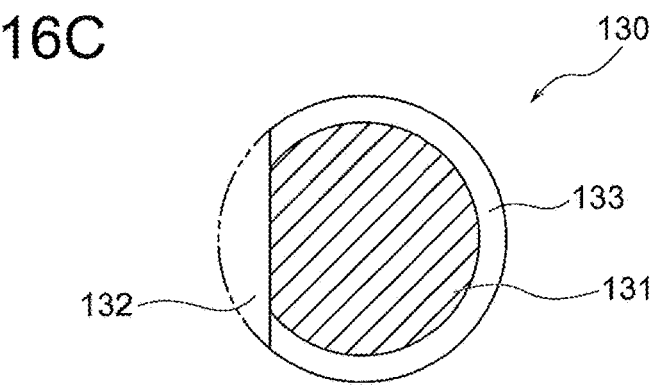

Moreover, an aperture member having a plurality of transmission parts different in shape will be described with reference to FIG. 16A, FIG. 16B, and FIG. 16C. FIG. 16A, FIG. 16B, and FIG. 16C are diagrams each showing an aperture member having a plurality of transmission parts different in shape, where FIG. 16A is a diagram showing the configuration of an aperture member having a transmission part at the center, FIG. 16B is a diagram showing the configuration of an aperture member having a circular light-shielding part and a ring transmission part at the central portion, and FIG. 16C is a diagram showing the configuration of an aperture member having a second transmission part outside of the light-shielding part.

As described above, in the sample observation device having the aperture member 5 shown in FIG. 2A or the aperture member 5' shown in FIG. 2B, even when the sample is colorless and transparent, it is possible to obtain a sample image with shadow. However, a sample having different surface inclinations sometimes needs to be observed simultaneously (in the same field of view).

In such a case, depending on the inclination of the sample surface, the aperture member used may fail to provide a sample image with sufficient shadows. Therefore, it is preferable that a colorless transparent sample can be observed even when the sample has different surface inclinations.

Then, the sample observation device of the present embodiment includes an illumination optical system and an observation optical system, and the illumination optical system includes a light source, a condenser lens, and an aperture member, and the observation optical system includes an objective lens and an imaging lens, and the aperture member has a light-shielding part or a darkening part, a first transmission part, and a second transmission part, and in the aperture member, the first transmission part is formed so as to include an optical axis of the illumination optical system, and the light-shielding part or the darkening part is positioned outside of an outer edge of the first transmission part, and the second transmission part is positioned outside of the first transmission part and is disposed asymmetrically with respect to the optical axis of the illumination optical system, and an image of an inner edge of the second transmission part is formed inside of an outer edge of a pupil of the objective lens, and an image of an outer edge of the second transmission part is formed outside of the outer edge of the pupil of the objective lens.

FIG. 16A is a diagram showing the configuration of an aperture member having a transmission part at the center. An aperture member 110 has a light-shielding part 111, a first transmission part 112, and a second transmission part 113. In the aperture member 110, the first transmission part 112 is formed so as to include the optical axis of the illumination optical system, the light-shielding part 111 is positioned outside of the outer edge of the first transmission part 112, and the second transmission part 113 is positioned outside of the outer edge of the first transmission part 112. Moreover, the second transmission part 113 is disposed asymmetrically with respect to the optical axis of the illumination optical system. Moreover, a darkening part may be used in place of the light-shielding part.

The light-shielding part 111, the first transmission part 112, and the second transmission part 113 are formed from a transparent member, for example, a glass plate or a resin plate. The light-shielding part 111 is formed, for example, by applying light-shielding paint on a glass plate. In contrast, the first transmission part 112 and the second transmission part 113 are not coated. The first transmission part 112 and the second transmission part 113 are thus a glass plate per se. The aperture member 110 is formed by providing the first transmission part 112 at the center of the light-shielding part 5a1 of the aperture member 5' shown in FIG. 2B.

In the aperture member 110, the shape of illumination light passing through the first transmission part 112 is a circle, which is the same shape as the shape of illumination light in bright-field observation.

By the way, when the light flux diameter of illumination light is changed in bright-field observation, the degree of coherence (coherency) of illumination light changes. The degree of coherence of illumination light affects the contrast of an image, resolution, and sharpness. When the light flux diameter of illumination light is reduced, the degree of coherence of illumination light is increased. As a result, since the contrast of the image is increased, even from a colorless transparent sample, an image having contrast (hereinafter referred to as a "coherent illumination image" as necessary) is obtained, for example. This coherent illumination image is not identical to a bright-field image but similar to a bright-field image.

It is noted that the coherent illumination image includes not only an image obtained with coherent illumination but also an image obtained with partial coherent illumination. In contrast, the bright-field image is an image obtained with partial coherent illumination. As just described, the coherent illumination image and the bright-field image both include an image obtained with partial coherent illumination, but the images are different in that the coherent illumination image is an image obtained with illumination light with higher coherency than that for the bright-field image.

The outer edge of the light-shielding part 111 is a circumference. In a case in which the shape of the light-shielding part 111 is supposed to be a circle, the diameter of the light-shielding part 111 is the diameter of the circle. In the aperture member 110, the diameter of the first transmission part 112 is smaller than the diameter of the light-shielding part 111. In this case, the light flux diameter of illumination light passing through the first transmission part 112 is smaller than the light flux diameter in the case where the light-shielding part 111 is not present. The illumination light passing through the first transmission part 112 is therefore light having a high degree of coherence.

Therefore, when the aperture member 110 is used, a shadow image is formed by the bow-shaped illumination light, and a coherent illumination image is formed by the circular illumination light. As a result, a sample image is an image in which a shadow image and a coherent illumination image overlap each other. Here, if the width of the second transmission part 113 is suitable for the inclination of the sample surface, a sample image in which a shadow image and a coherent illumination image overlap each other is obtained. In contrast, if the width of the second transmission part 113 is not suitable for the inclination of the sample surface, a sample image having contrast is obtained although a sample image having sufficient shadows is not obtained. Therefore, it is possible to observe the colorless transparent sample in the observation field of view.

As described above, by using the aperture member 110, it is possible to obtain a sample image with shadow and a sample image having contrast from a colorless transparent sample. Moreover, even when a sample image with shadow fails to be observed, it is possible to observe the colorless transparent sample in the observation field of view. Moreover, it is possible to observe the outline of the colorless transparent sample with a sample image with shadow, and the interior of the colorless transparent sample with a coherent illumination image.

Moreover, the sample observation device of the present embodiment includes an illumination optical system and an observation optical system, and the illumination optical system includes a light source, a condenser lens, and an aperture member, and the observation optical system includes an objective lens and an imaging lens, and the aperture member has a first light-shielding part or darkening part, a second light-shielding part or darkening part, a first transmission part, and a second transmission part, and the aperture member is disposed such that the first light-shielding part or darkening part includes an optical axis of the illumination optical system, and the first transmission part is positioned outside of an outer edge of the first light-shielding part or darkening part, and the second light-shielding part or darkening part is positioned outside of an outer edge of the first transmission part, and the second transmission part is positioned outside of the first transmission part and is disposed asymmetrically with respect to the optical axis of the illumination optical system, and an image of an inner edge of the second transmission part is formed inside of an outer edge of a pupil of the objective lens, and an image of an outer edge of the second transmission part is formed outside of the outer edge of the pupil of the objective lens.

FIG. 16B is a diagram showing the configuration of an aperture member having a circular light-shielding part and a ring transmission part at the central portion. An aperture member 120 has a first light-shielding part 121, a second light-shielding part 122, a first transmission part 123, and a second transmission part 124. In the aperture member 120, the first light-shielding part 121 is disposed so as to include the optical axis of the illumination optical system, and the first transmission part 123 is disposed outside of the outer edge of the first light-shielding part 121, and the second light-shielding part 122 is positioned outside of the outer edge of the first transmission part 123, and the second transmission part 124 is positioned outside of the outer edge of the first transmission part 123. Moreover, the second transmission part 124 is disposed asymmetrically with respect to the optical axis of the illumination optical system. Moreover, a darkening part may be used in place of the light-shielding part.

The first light-shielding part 121, the second light-shielding part 122, the first transmission part 123, and the second transmission part 124 are formed from a transparent member, for example, a glass plate or a resin plate. The first light-shielding part 121 and the second light-shielding part 122 are formed, for example, by applying light-shielding paint on a glass plate. In contrast, the first transmission part 123 and the second transmission part 124 are not coated. The first transmission part 123 and the second transmission part 124 are thus a glass plate per se. The aperture member 120 is formed by providing the first light-shielding part 121 and the first transmission part 123 in the light-shielding part 5'a1 of the aperture member 5' shown in FIG. 2B.

In the aperture member 120, the first transmission part 123 serves as an illumination ring for phase contrast observation. The use of the aperture member 120 enables observation with a microscope objective lens for phase contrast. In this case, a phase contrast image is formed by the inner ring-shaped illumination light, and a shadow image is formed by the outer ring-shaped illumination light. As a result, a sample image is an image in which a shadow image and a phase contrast image overlap each other. As described above, when the width of the second transmission part 124 is not adapted to the inclination of the sample surface, a phase contrast image is obtained although a sample image with sufficient shadows is not obtained. Therefore, it is possible to observe the colorless transparent sample in the observation field view.

As described above, by using the aperture member 120, it is possible to obtain a sample image with shadow and a phase contrast image from a colorless transparent sample.

Moreover, even when a sample image with shadow fails to be observed, it is possible to observe the colorless transparent sample in the observation field view.

The sample observation device of the present embodiment includes an illumination optical system and an observation optical system, and the illumination optical system includes a light source, a condenser lens, and an aperture member, and the observation optical system includes an objective lens and an imaging lens, and the aperture member has a light-shielding part or a darkening part, a first transmission part, and a second transmission part, and the first transmission part is disposed asymmetrically with respect to an optical axis of the illumination optical system, and the second transmission part is disposed outside of the light-shielding part or the darkening part, and an image of an inner edge of the first transmission part is formed inside of an outer edge of a pupil of the objective lens, and an image of an outer edge of the first transmission part is formed outside of the outer edge of the pupil of the objective lens.

FIG. 16C is a diagram showing the configuration of an aperture member having a second transmission part outside of the light-shielding part. An aperture member 130 has a light-shielding part 131, a first transmission part 132, and a second transmission part 133. In the aperture member 130, the first transmission part 132 is disposed asymmetrically with respect to the optical axis of the illumination optical system. The second transmission part 133 is positioned outside of the light-shielding part 131. Moreover, the light-shielding part 131 is formed so as to include the optical axis of the illumination optical system. Moreover, a darkening part may be used in place of the light-shielding part.

The light-shielding part 131, the first transmission part 132, and the second transmission part 133 are formed from a transparent member, for example, a glass plate or a resin plate. The light-shielding part 131 is formed, for example, by applying light-shielding paint on a glass plate. In contrast, the first transmission part 132 and the second transmission part 133 are not coated. The first transmission part 132 and the second transmission part 133 are thus a glass plate per se. The aperture member 130 is formed by providing the second transmission part 133 on the outside of the light-shielding part 5a1 of the aperture member 5' shown in FIG. 2B.

Figure 17A:
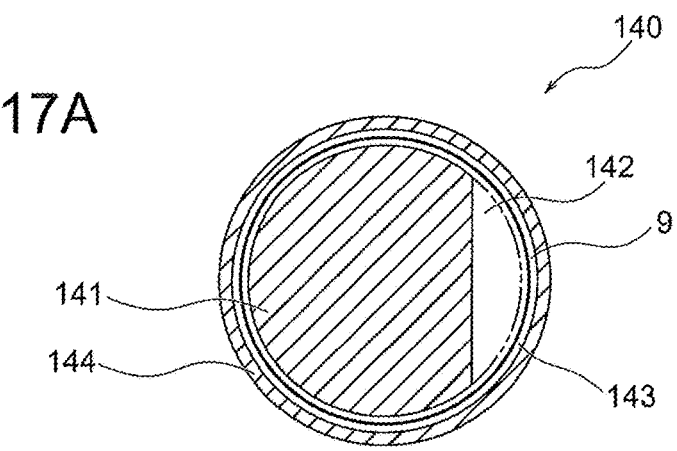
FIG. 17A and FIG. 17B are diagrams showing the relation between the pupil of the objective lens and the image of the aperture member, where
Figure 17B:
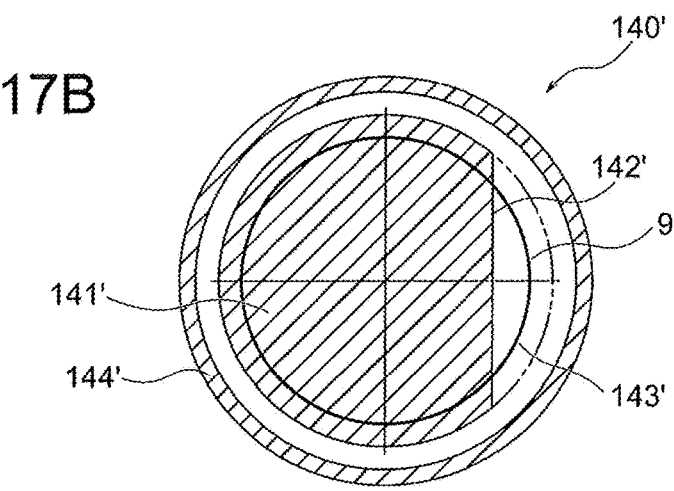

The relation between the pupil of the objective lens and the image of the aperture member will be described with reference to FIG. 17A and FIG. 17B. FIG. 17A and FIG. 17B are diagrams showing the relation between the pupil of the objective lens and the image of the aperture member, where FIG. 17A is a diagram showing the image of the first transmission part formed inside of the outer edge of the pupil of the objective lens, and FIG. 17B is a diagram showing the image of the first transmission part formed at the position of the outer edge of the pupil of the objective lens. In FIG. 17, an aperture member having a ring light-shielding part on the outside of the second transmission part is used in order to make clear the outer edge of the second transmission part.

As described above, by disposing the optical system between the aperture member and the pupil of the objective lens, the image of the aperture member is formed at the pupil position of the objective lens. The size of the image of the aperture member is determined by the magnification of the optical system. When the optical system includes a condenser lens and an objective lens, the magnification β of the optical system is a value obtained by dividing the focal length of the objective lens by the focal length of the condenser lens. Then, the size of the image of the aperture member can be changed by changing at least one of the focal length of the objective lens and the focal length of the condenser lens.

For example, when the magnification of the optical system is $β_1$, the relation between the pupil 9 of the objective lens and the image 140 of the aperture member is as shown in FIG. 17A. As shown in FIG. 17A, the image 141 of the first light-shielding part, the image 142 of the first transmission part, and the inner edge of the image 143 of the second transmission part are formed inside of the outer edge of the pupil 9 of the objective lens. In contrast, the outer edge of the image 143 of the second transmission part and the image 144 of the second light-shielding part are formed outside of the outer edge of the pupil 9 of the objective lens.

When the magnification of the optical system is $β_1$, the image 142 of the first transmission part is formed inside of the outer edge of the pupil 9 of the objective lens. Hence, the inner edge of the image 142 of the first transmission part is formed inside of the pupil 9 of the objective lens but the outer edge of the image 142 of the first transmission part is not formed outside of the pupil 9 of the objective lens.

As just described, when the magnification of the optical system is $β_1$, the image 142 of the first transmission part is not formed so as to include part of the outer edge of the pupil 9 of the objective lens. That is, the relation between the outer edge of the pupil 9 of the objective lens and the image 142 of the first transmission part is not as shown in FIG. 3C. Hence, even when the image 140 of the aperture member is displaced with respect to the pupil 9 of the objective lens along the first axis, a change of brightness (change of the amount of light flux) as shown in FIG. 8A is not obtained.

In FIG. 17A, when the image 140 of the aperture member moves rightward along the first axis, the brightness does not change until the image 141 of the first light-shielding part reaches the outer edge of the pupil 9 of the objective lens. When the image 141 of the first light-shielding part is positioned on the outside of the outer edge of the pupil 9 of the objective lens, a change occurs in brightness. In contrast, when the image 140 of the aperture member moves leftward along the first axis, the state in which the brightness does not change continues for a long time, compared with moving rightward, because the image 142 of the first transmission part is present.

Moreover, as for the direction along the second axis, a change occurs in brightness when the image 141 of the first light-shielding part is positioned on the outside of the outer edge of the pupil 9 of the objective lens. Between the direction along the first axis and the direction along the second axis, a change in brightness starts earlier as the moving direction of the image 140 of the aperture member is closer to the direction along the second axis.

As just described, when the magnification of the optical system is $β_1$, a change in brightness occurs similarly in directions except the left direction in the first axis. Therefore, in those directions, a change in shape at the sample can be detected as a change in brightness.

Next, when the magnification of the optical system is $β_2$, the relation between the pupil 9 of the objective lens and the image 140' of the aperture member is as shown in FIG. 17B. Here, $β_1 < β_2$. As shown in FIG. 17B, the inner edge of the image 142' of the first transmission part is formed inside of the outer edge of the pupil 9 of the objective lens. In contrast, the outer edge of the image 141' of the first light-shielding part, the outer edge of the image 142' of the first transmission part, the image 143' of the second transmission part, and the image 144' of the second light-shielding part are formed outside of the outer edge of the pupil 9 of the objective lens.

When the magnification of the optical system is $\beta_2$, the image 142' of the first transmission part is formed so as to include part of the outer edge of the pupil 9 of the objective lens. Hence, the inner edge of the image 142' of the first transmission part is formed inside of the pupil 9 of the objective lens, and the outer edge of the image 142' of the first transmission part is formed outside of the pupil 9 of the objective lens.

As just described, when the magnification of the optical system is $\beta_2$, the relation between the outer edge of the pupil 9 of the objective lens and the image 142' of the first transmission part represents the positional relation as shown in FIG. 3C. Thus, when the image 140' of the aperture member is displaced with respect to the pupil 9 of the objective lens along the first axis, a change in brightness as shown in FIG. 8A is obtained.

As described above, when the magnification of the optical system is $\beta_1$, a sample image in which the generated direction of shadow is not substantially limited is obtained, whereas when the magnification of the optical system is $\beta_2$, a sample image in which the generated direction of shadow is limited is obtained.

Moreover, in the sample observation device of the present embodiment, it is preferable that another aperture member different from the aperture member, and a moving mechanism for moving the aperture member and the other aperture member are included.

With this configuration, it is possible to change the size and the position of the image of the transmission part. That is, it is possible to change $L_0$ and $L_1$ freely by changing the aperture member to the other aperture member. Therefore, it is possible to create an illumination state such that best shadows is produced for the sample and the objective lens used.

Further, when an objective lens for phase contrast is used, the following effects are achieved. Using a ring slit for phase contrast observation for the illumination aperture enables phase contrast observation, and using the aperture member shown in FIG. 2 enables observation with the sample observation device of the present embodiment. That is, the observation with the sample observation device of the present embodiment and the phase contrast observation can be carried out without replacing the objective lens. The observation with the sample observation device of the present embodiment and observation by a method such as differential interference observation or Hofmann modulation contrast observation can be carried out similarly without replacing the objective lens.

In the sample observation device of the present embodiment, it is preferable that the observation optical system includes an aperture member, and the aperture member is disposed at the pupil position of the objective lens or at a position conjugate with the pupil position of the objective lens.

With this configuration, it is possible to change the size of the pupil of the objective lens for the image of the transmission part. Thus, best shadows can be produced for a sample.

Moreover, when vignetting occurs, a difference in size of light flux arises between the light flux emitted from the center of the sample to reach the center of the sample image (hereinafter referred to as "on-axis light flux" as appropriate) and the light flux emitted from the periphery of the sample to reach the periphery of the sample image (hereinafter referred to as "off-axis light flux" as appropriate). In general, when vignetting occurs, the shape of on-axis light flux is a circle, whereas the shape of off-axis light flux is approximately an oval.

For this reason, in off-axis light flux, the image of the transmission part is formed inside of the outer edge of the pupil of the objective lens. The relation between the displacement amount $\Delta$ and the amount of light flux I then differs between the center and the periphery of the sample image. The displacement amount $\Delta$ is, for example, $\Delta_{H1}$, $\Delta_{H2}$, $\Delta_{V1}$ and $\Delta_{V2}$ described above.

Then, it is possible to reduce vignetting by disposing the aperture in the observation optical system. With this configuration, it is possible to make a shape of the off-axis light flux into a circle. Thus, in the off-axis light flux, the image of the inner edge of the transmission part is formed inside of the outer edge of the pupil of the objective lens, and the image of the outer edge of the transmission part is formed outside of the outer edge of the pupil of the objective lens. As a result, the relation between the displacement amount $\Delta$ and the amount of light flux I at the periphery of the sample image is equal to the relation at the center. Thus, a sample image which has uniform brightness from the center to the periphery can be obtained.

The same effects can be achieved by using an objective lens with small vignetting. In an objective lens with small vignetting, a lens having a larger lens diameter than that of an objective lens with large vignetting is used. In this case, the difference between the diameter of off-axis light flux and the diameter of on-axis light flux is reduced. As a result, a sample image which has uniform brightness from the center to the periphery can be obtained. Based on theses, it is preferable to use an objective lens with small vignetting.

Moreover, in the sample observation device of the present embodiment, it is preferable that the light source is a monochromatic light source, or the illumination optical system has a wavelength selecting unit.

With this configuration, since the wavelength range of illumination light can be narrowed, chromatic aberration of the pupil can be suppressed. Therefore, it is possible to improve the contrast of the sample image.

Moreover, in the sample observation device of the present embodiment, an image processing device is included.

With this configuration, an image with even better contrast can be obtained. Moreover, when an image of the sample is obtained monochromatic, the image of the sample can be converted into a color suitable for observation.

Figure 18:
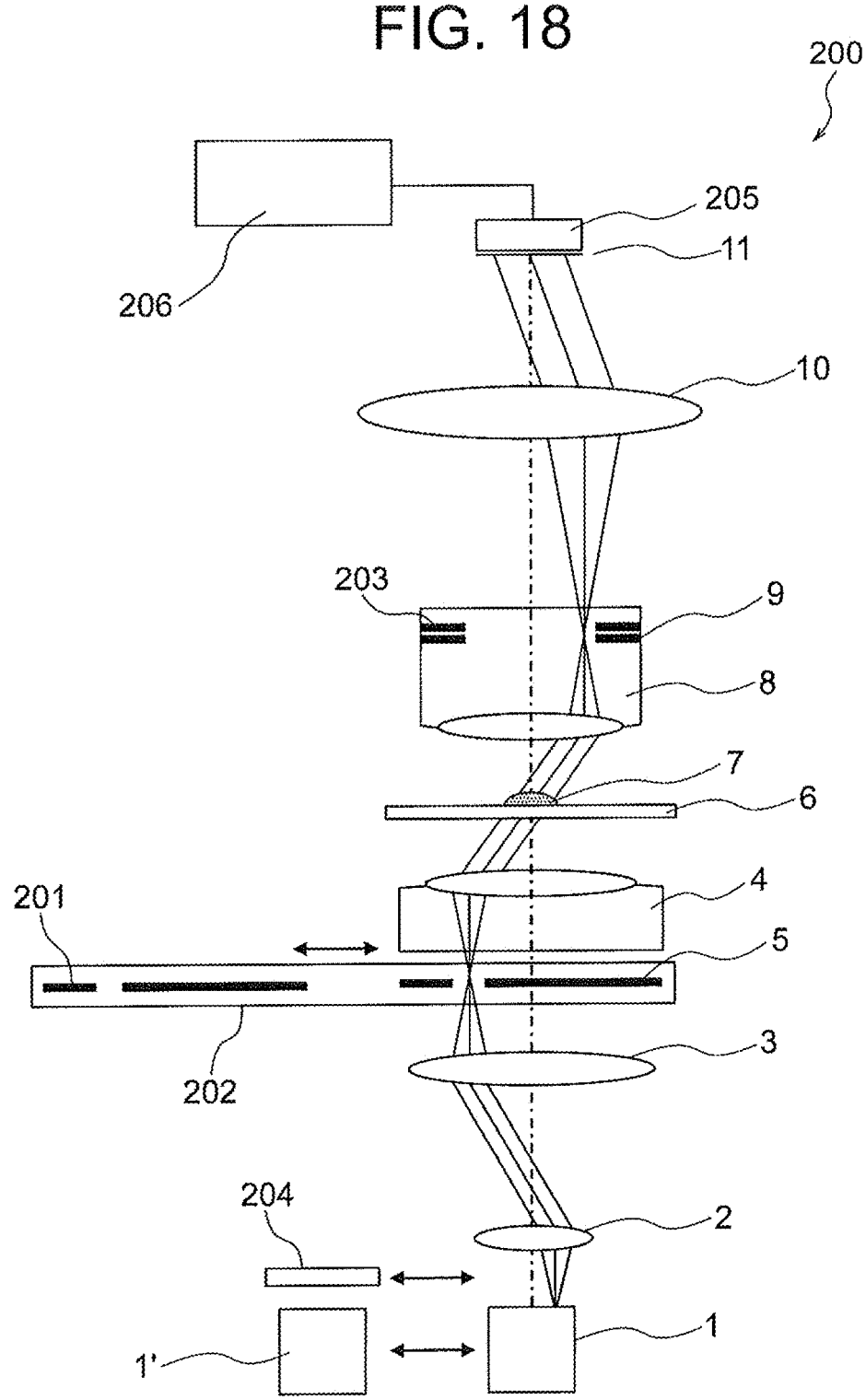
FIG. 18 is a diagram showing the configuration of another sample observation device of the present embodiment.

FIG. 18 is a diagram showing the configuration of another sample observation device of the present embodiment. The same reference numerals are assigned to the same configurations as those in FIG. 1, and their detailed descriptions are omitted.

A sample observation device 200 includes an aperture member 5 and an aperture member 201. The aperture member 5 and the aperture member 201 are held at a moving mechanism 202. A slider or a turret is available as the moving mechanism 202, for example. When the moving mechanism 202 is a slider, the aperture member 5 and the aperture member 201 move in the direction orthogonal to the optical axis of the observation optical system. When the moving mechanism 202 is a turret, the aperture member 5 and the aperture member 201 rotate around an axis parallel to the optical axis of the observation optical system.

As just described, it is preferable that the aperture member for sample observation including the objective lens of the present embodiment is disposed at the illumination optical system of the sample observation device, and includes a first aperture member and a second aperture member, and the first aperture member and the second aperture member are different apertures. Then a transmission part of the first aperture member is preferably configured so that an image of an inner edge of the transmission part is formed inside of an outer edge of a pupil of a first objective lens, and an image of an outer edge of the transmission part of the first aperture member is formed outside of the outer edge of the pupil of the first objective lens. The first aperture member and the second aperture member are different, it means that the position or the size of the transmission part differs between the first aperture member and the second aperture member.

Moreover, the second aperture member may have a transmission part corresponding to a second objective lens having different magnification from that of the first objective lens which corresponds to the first aperture member. That is, the transmission part of the second aperture member is preferably configured so that an image of an inner edge of the transmission part is formed inside of an outer edge of a pupil of the second objective lens, and an image of an outer edge of the transmission part of the second aperture member is formed outside of the outer edge of the pupil of the second objective lens.

Moreover, when bright-field observation is performed by the second aperture member, the second aperture member may be configured to include the transmission part at a center. Moreover, when phase-contrast observation is performed using the first objective lens by the second aperture member, the second aperture member may be configured to include the transmission part whose diameter is smaller than the diameter of the transmission part of the first aperture member.

Moreover, it is preferable that the aperture member for sample observation including the objective lens of the present embodiment may further include a third aperture member, and the second aperture member may include a transmission part for phase-contrast observation, and the third aperture member may include a transmission part for bright-field observation.

As just described, according to the aperture member for sample observation including the objective lens of the present embodiment, it is possible to irradiate the objective lens with light in accordance with various observation methods. Thereby, when observation is performed using the first aperture member, and the sample includes an interested region, it is possible to perform phase-contrast observation or bright-field observation for the interested region by changing the aperture member.

The aperture member may include a transmission region variable part that can change the transmission region of the transmission part. The transmission region variable part may be configured by a liquid-crystal shutter, for example. With this configuration, it is possible to implement the aperture member 5 and the aperture member 54 with one aperture member. In this case, the moving mechanism is not required.

Moreover, in the sample observation device 200, an aperture member 203 is disposed at the position of the pupil 9 of the objective lens. In FIG. 18, for ease in viewing, the position of the pupil 9 of the objective lens and the position of the aperture member 203 are depicted so that they are apart from each other.

Moreover, in the sample observation device 200, a wavelength selection device 204 may be disposed removably in the optical path of the illumination optical system, e.g., between the light source 1 and the lens 2. When the light source 1 is white light, light having a wide wavelength range is emitted from the light source 1. Then, by inserting the wavelength selection element 204 into the optical path, it is possible to select light having a narrower wavelength range than white light as the illumination light. The light source 1 may be a monochromatic light source 1'.

Moreover, the sample observation device 200 may include an image-pickup element 205 and an image processing device 206. The image-pickup element 205 may be a CCD or a CMOS, for example. The image-pickup element 205 is disposed at an image position 11. A sample image picked up by the image-pickup element 205 is sent to the image processing device 206. In the image processing device 206, it is configured to be able to perform processing, such as contrast enhancement, noise removal or color conversion.

By the way, the microscope objective lens is a telecentric optical system. Therefore, the condenser lens also is a telecentric optical system. Accordingly, the pupil position of the condenser lens is a front focal position of the condenser lens. Here, as stated above, in the sample observation device of the present embodiment, the aperture member is disposed at the focal position (front focal position) of the condenser lens 4. With this configuration, a center part of the illumination light is shielded at the pupil position of the condenser lens. However, there is no need to set the position of shielding a center part of the illumination light exactly at the pupil position of the condenser lens, and the position may be in the vicinity of the pupil position of the condenser lens.

Here, as displacement (displacement in the optical axis direction) between the aperture member and the pupil position of the condenser lens increases, an image of the transmission part also is displaced from the pupil of the objective lens. For instance, when the aperture member coincides with the pupil position of the condenser lens, a light beam (hereinafter, referred to as "beam $L_{in}$" as appropriate) passing through the innermost part of the transmission part reaches the inside of the pupil of the objective lens. However, as the aperture member is displaced from the pupil position of the condenser lens, the beam $L_{in}$ heads for from the inside to the outside of the pupil of the objective lens. That is, an image of the transmission part is displaced from the pupil of the objective lens.

Moreover, when the objective lens is changed, the observation area changes. When the observation area changes, the angle of the beam $L_{in}$ with reference to the optical axis also changes. When this angle changes, the position of the beam $L_{in}$ reaching the pupil of the objective lens changes. That is, an image of the transmission part is displaced from the pupil of the objective lens. As a result, generation of shadow will change.

Then, the allowable range of displacement between the aperture member and the pupil position of the condenser lens is set while considering a change in the observation area. In the sample observation device of the present embodiment, the range (allowable range) in the vicinity of the pupil position is desirably within 20% of the focal length of the condenser lens. As long as within this range, it is possible to decrease a difference in the generated direction of shadow and the amount of generation between the center and the periphery of the sample. The range in the vicinity of the pupil position is more preferably within 10% of the focal length of the condenser lens.

As described above, in the sample observation device of the present embodiment, it is preferable that the observation optical system includes an aperture member, and the aperture member is disposed at the pupil position of the objective lens or at a position conjugate with the pupil position of the objective lens. Here, when the shape of the transmission part of the aperture member is, for example, a single circle formed at the center of the aperture member, the aperture member may be disposed at the pupil position of the objective lens. However, when the aperture member has a plurality of transmission parts, it is preferable that the aperture member is disposed at a position conjugate with the pupil position of the objective lens.

Figure 19:
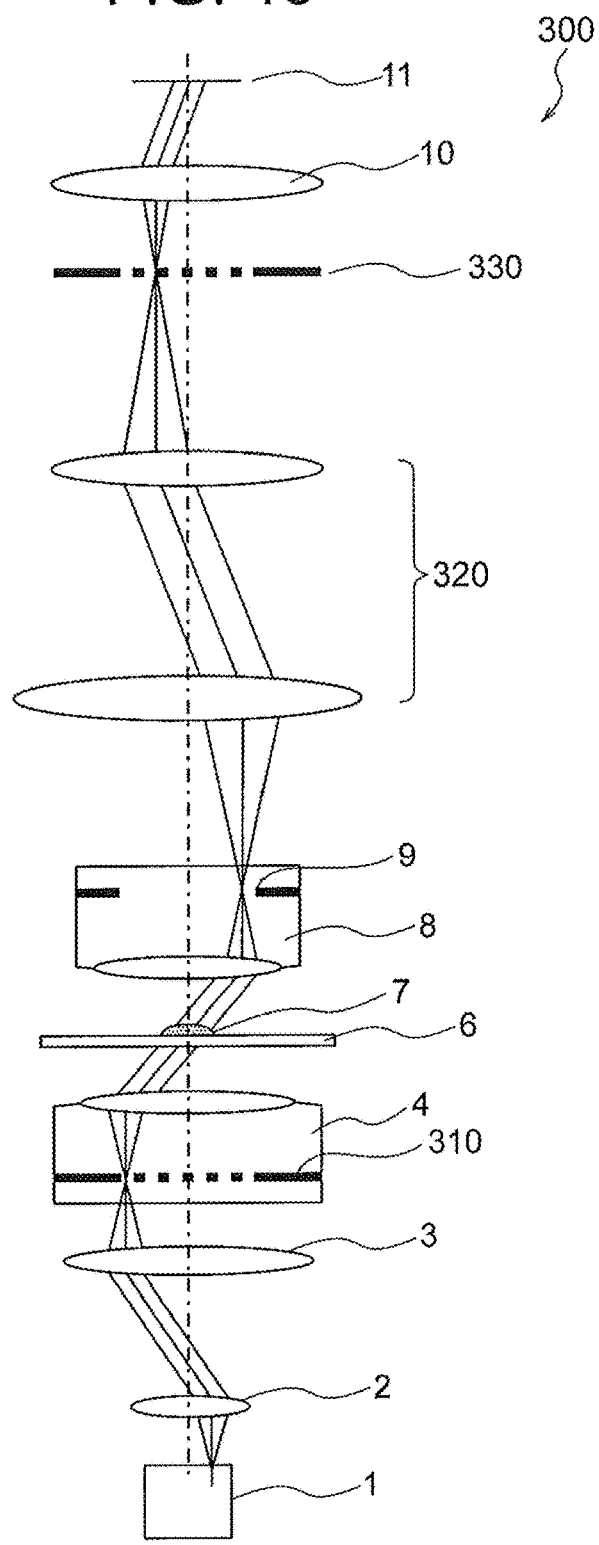
FIG. 19 is a diagram showing the configuration of yet another sample observation device of the present embodiment.

FIG. 19 is a diagram showing the configuration of yet another sample observation device of the present embodiment. In FIG. 19, a configuration in which the aperture member is disposed at a position conjugate with the pupil position of the objective lens is shown. The same components as those in FIG. 1 are denoted with the same numerals and a description thereof will be omitted.

A sample observation device 300 includes an aperture member 310, a relay optical system 320, and an aperture member 330. The aperture member 310 is disposed at the focal point of the condenser lens 4. The image of the aperture member 310 is formed at the position of the pupil 9 of the objective lens through the condenser lens 4 and the objective lens 8.

Here, in the sample observation device 300, the relay optical system 320 is disposed between the objective lens 8 and the imaging lens 10. The image of the pupil 9 of the objective lens is formed between the relay optical system 320 and the imaging lens 10 by the relay optical system 320. The aperture member 330 is disposed at this image position of the pupil 9 of the objective lens. The image of the aperture member 310 is thus formed at the position of the aperture member 330.

Figure 20A:
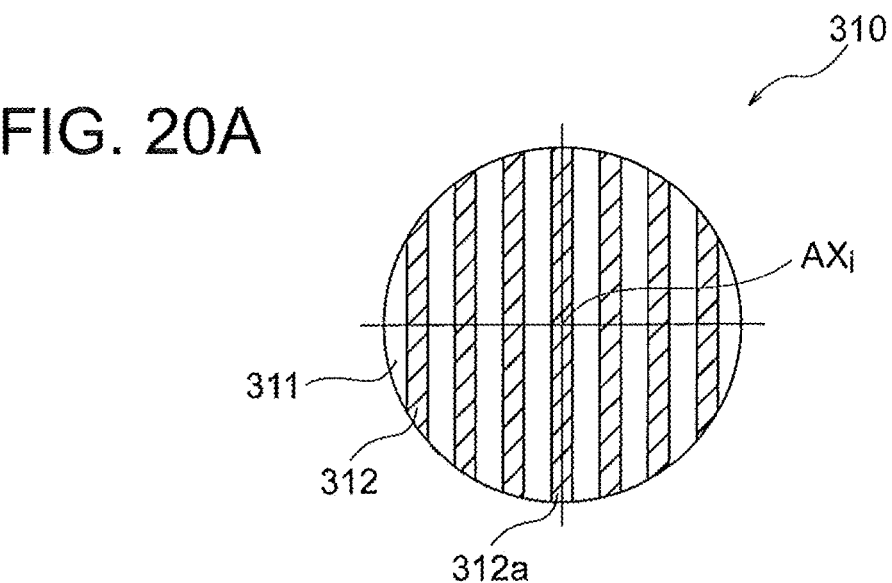
FIG. 20A and FIG. 20B are diagrams showing a configuration of aperture members, where
Figure 20B:
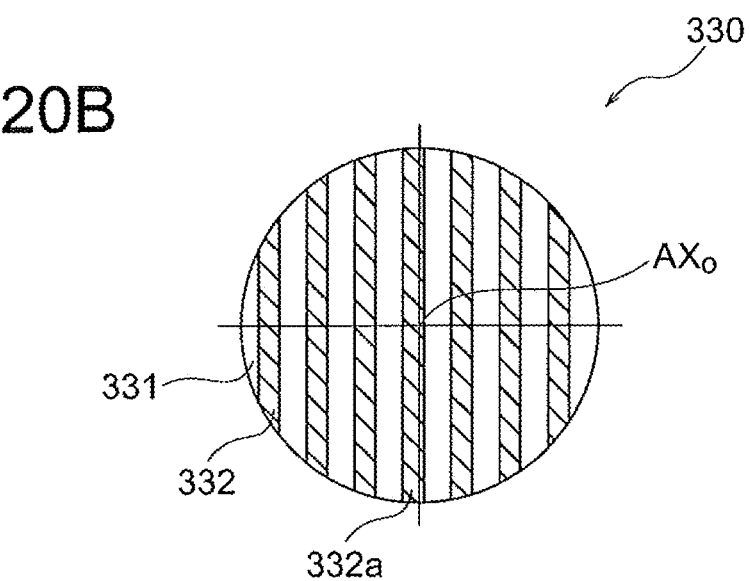

The configuration of the aperture member 310 and the aperture member 330 will be described with reference to FIG. 20. FIG. 20A and FIG. 20B are diagrams showing a configuration of the aperture members, where FIG. 20A is a diagram showing a configuration of the aperture member on the illumination optical system side, and FIG. 20B is a diagram showing a configuration of the aperture member on the observation optical system side.

The aperture member 310 is an aperture member on the illumination optical system side. The aperture member 310 has a plurality of transmission parts 311 and a plurality of light-shielding parts 312. The shape of the transmission part 311 and the shape of the light-shielding part 312 are both in the form of a strip. The transmission parts 311 and the light-shielding parts 312 are alternately formed along the first axis.

A light-shielding part 312a is one of a plurality of light-shielding parts. The light-shielding part 312a is disposed so as to include the optical axis $AX_i$ of the illumination optical system. Here, the center of the light-shielding part 312a agrees with the optical axis $AX_i$ of the illumination optical system. The pattern of light and shade formed by the transmission parts 311 and the light-shielding parts 312 is line symmetric with respect to a line including the optical axis $AX_i$ of the illumination optical system and parallel to the second axis.

The aperture member 330 is an aperture member on the observation optical system side. The aperture member 330 has a plurality of transmission parts 331 and a plurality of light-shielding parts 332. The shape of the transmission part 331 and the shape of the light-shielding part 332 are both linear. The transmission parts 331 and the light-shielding parts 332 are alternately formed along the first axis.

A light-shielding part 332a is one of a plurality of light-shielding parts. The light-shielding part 332a is disposed so as to include the optical axis $AX_o$ of the observation optical system. Here, the center of the light-shielding part 332a is slightly displaced from the optical axis $AX_o$ of the observation optical system. The pattern of light and shade formed by the transmission parts 331 and the light-shielding parts 332 is not line symmetric with respect to a line including the optical axis $AX_o$ of the observation optical system and parallel to the second axis.

Figure 21A:
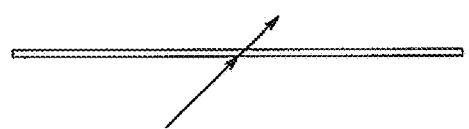
FIG. 21A, FIG. 21B, FIG. 21C, FIG. 21D, FIG. 21E, and FIG. 21F are diagrams showing the relation between the aperture member on the observation optical system side and the image of the aperture member on the illumination optical system side, where
Figure 21B:
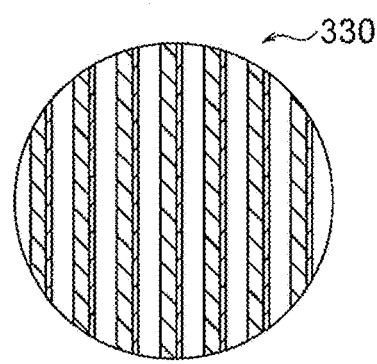
Figure 21C:
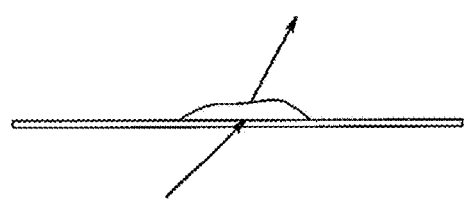
Figure 21D:
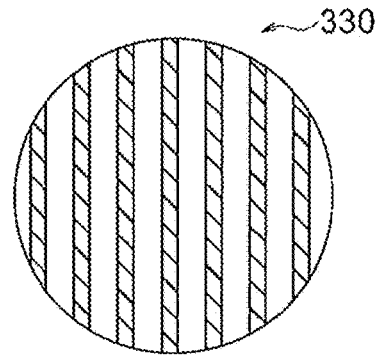
Figure 21E:
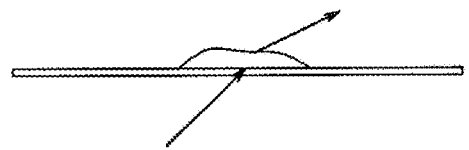
Figure 21F:
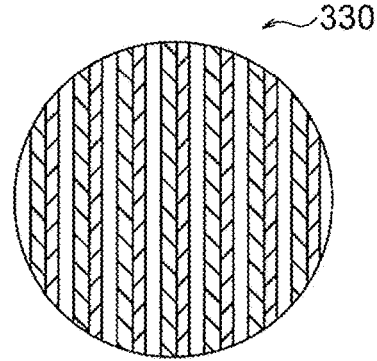

FIG. 21A, FIG. 21B, FIG. 21C, FIG. 21D, FIG. 21E, and FIG. 21F are diagrams showing the relation between the aperture member on the observation optical system side and the image of the aperture member on the illumination optical system side. FIG. 21A, FIG. 21C, and FIG. 21E are diagrams each showing refraction of light at the sample position, and FIG. 21B, FIG. 21D, and FIG. 21F are diagrams each showing the relation between the aperture member on the observation optical system side and the image of the aperture member on the illumination optical system side.

When no sample is present, as shown in FIG. 21A, light incident on the holding member and light emitted from the holding member have the same direction of travel. As a result, the image of the aperture member 310 formed at the position of the aperture member 330 is as shown in FIG. 21B. In FIG. 21B, the image of the aperture member 310 is formed next to the light-shielding part of the aperture member 330.

Next, the case where a sample is present will be described. When the sample surface is elevated from the left side to the right side of the first axis, as shown in FIG. 21C, light emitted from the sample is deflected in the direction toward the optical axis. As a result, the image of the aperture member 310 formed at the position of the aperture member 330 is as shown in FIG. 21D. In FIG. 21D, the image of the aperture member 310 is formed to be superimposed on the light-shielding part of the aperture member 330.

In contrast, when the sample surface is lowered from the left side to the right side of the first axis, as shown in FIG. 21E, light emitted from the sample is deflected in the direction away from the optical axis. As a result, the image of the aperture member 310 formed at the position of the aperture member 330 is as shown in FIG. 21F. In FIG. 21F, the image of the aperture member 310 is formed next to the light-shielding part of the aperture member 330.

When the areas of the transmission parts as a whole are compared in FIG. 21B, FIG. 21D, and FIG. 21F, the area of the transmission parts is largest in FIG. 21D, second largest in FIG. 21B, and smallest in FIG. 21F. Since the area of the transmission part corresponds to the brightness of the sample image, the brightness of the sample image differs between when a sample is present and when no sample is present, in the sample observation device 300. In addition, the brightness of the sample image changes according to the direction of the inclination of the sample and the steepness of the inclination.

As just described, in the sample observation device of the present embodiment, a change in shape at the sample (change of inclination) is converted into a change of displacement of the image of the light-shielding part. The change of displacement of the image of the light-shielding part causes a change in the amount of light flux passing through the aperture member on the observation optical system side. That is, a change in shape at the sample can be detected as a change in brightness. As a result, even when the sample is colorless and transparent, it is possible to obtain a sample image with shadow. When the image of the light-shielding part is displaced, the image of the transmission part is also displaced. Displacementing of the image of the transmission part produces a similar result.

Moreover, in the sample observation device of the present embodiment, since the aperture member 330 is disposed at a position conjugate with the pupil 9 of the objective lens, an objective lens for bright-field observation can be used as the objective lens. Moreover, the position adjustment of the aperture member 330, for example, the position adjustment in the direction along the optical axis and the adjustment for matching the orientation of the pattern of light and shade in the aperture member 310 with that in the aperture member 330 become easy. Even when the aperture member 330 is disposed at the pupil position of the objective lens, the brightness of the sample image changes according to the direction of the inclination of the sample and the steepness of the inclination.

Figure 22:
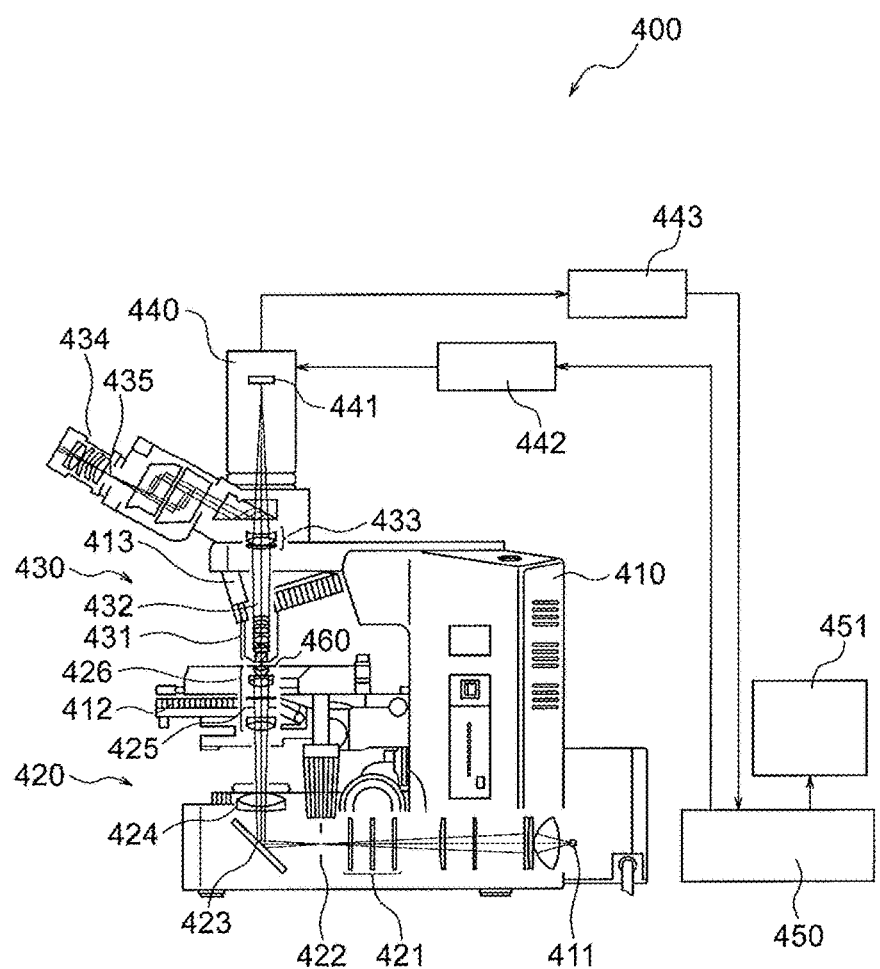
FIG. 22 is a diagram showing the configuration of a sample observation device including an image processing device.

As stated above, the sample observation device of the present embodiment preferably includes an image processing device. FIG. 22 is a diagram showing the configuration of a sample observation device including an image processing device.

A sample observation device 400 includes a main body part 410, an illumination optical system 420, an observation optical system 430, an image pickup device 440, and an image processing device 450.

The main body part 410 includes a light source 411, a stage 412 and a revolver 413. The illumination optical system 420 includes various types of optical filters 421, a field stop 422, a mirror 423, a lens 424, an aperture member 425, and a condenser lens 426. The observation optical system 430 includes an objective lens 431, an imaging lens 433, and an eyepiece 434. In the vicinity of the objective lens 431, a pupil 432 of the objective lens is located.

To the main body part 410, the light source 411 is connected. Illumination light emitted from the light source 411 enters the illumination optical system 420, and reaches the condenser lens 426. Here, the aperture member 425 is disposed at the pupil position of the condenser lens 426. Moreover, as the aperture member 425, the aperture member 5 shown in FIG. 2A is used.

Above the condenser lens 426, the stage 412 is disposed. Moreover, a sample 460 is placed on the stage 412. Further, above the stage 412, the revolver 413 is located, and the objective lens 431 is held at the revolver 413.

The sample 460 is irradiated with illuminating light emitted from the condenser lens 426. Light from the sample 460 enters the objective lens 431. Here, the pupil 432 of the objective lens is conjugate to the aperture member 425. Therefore, the image of the aperture member 425 is formed at the position of the pupil 432 of the objective lens.

Here, in the sample observation device 400, an image of the inner edge of the transmission part of the aperture member 425 is formed inside of the outer edge of the pupil of the objective lens 431, and an image of the outer edge of the transmission part of the aperture member 425 is formed outside of the outer edge of the pupil of the objective lens 431.

Therefore, the amount of imaging light emitted from the objective lens 431 changes with a change in shape at the sample 460 (change in inclination). Thereby, it is possible to detect a change in shape at the sample as a change in brightness. As a result, it is possible to obtain a sample image with shadow, even when the sample is colorless and transparent.

The imaging light emitted from the objective lens 431 is collected by the imaging lens 433, and an image of the sample 460 is formed at the light-collecting position. In the sample observation device 400, a prism is disposed, following the imaging lens 433. Apart of the imaging light is reflected to the side of the eyepiece 434 by this prism. As a result, an optical image 435 of the sample is formed in the vicinity of the eyepiece 434. When observation using the eyepiece 434 is not performed, the prism may be moved to the outside of the optical path.

Meanwhile, the imaging light that passed through the prism enters the image pickup device 440. The image pickup device 440 includes an image-pickup element 441. An optical image of the sample 460 is formed on the image-pickup element 441 by imaging lens 433, whereby the optical image of the sample 460 is picked up. In this way, a sample image with shadow can be obtained. The optical system may be disposed between the imaging lens 433 and the image-pickup element 441. In this case, an optical image of the sample 460 is formed on the image-pickup element 441 by the imaging lens 433 and this optical system.

Moreover, to the image pickup device 440, a camera controller 442 and a video board 443 are connected. Moreover, the camera controller 442 and the video board 443 are both connected to the image processing device 450.

Control of image pickup is performed by the camera controller 442. Moreover, control of the camera controller 442 is performed by the image processing device 450. The control of the camera controller 442 may be performed by other devices, such as a computer. Moreover, an image signal output from the image pickup device 440 is input to the image processing device 450 via the video board 443. In the image processing device 450, various electrical processing is performed. The result of the processing is displayed on the display device 451.

By including the image processing device, it is possible to perform various image processing. Examples of the image processing are described below.

Figure 23A:
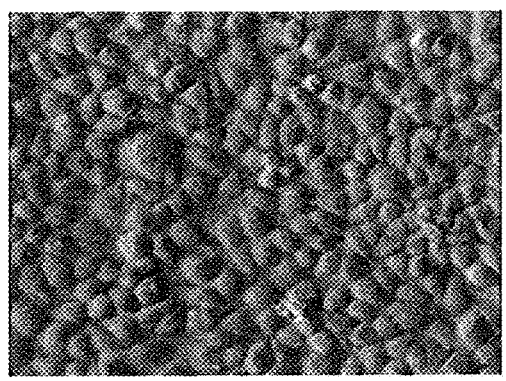
FIG. 23A, FIG. 23B, FIG. 23C, and FIG. 23D are electronic images of cells, where
Figure 23B:
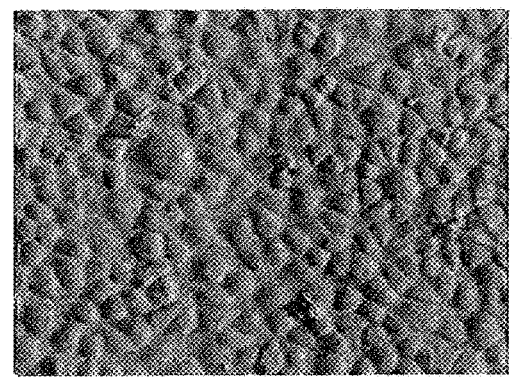
Figure 23C:
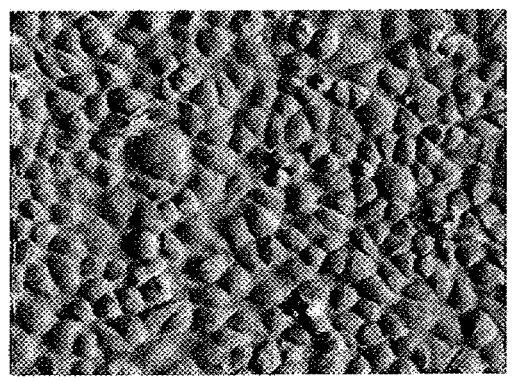
Figure 23D:
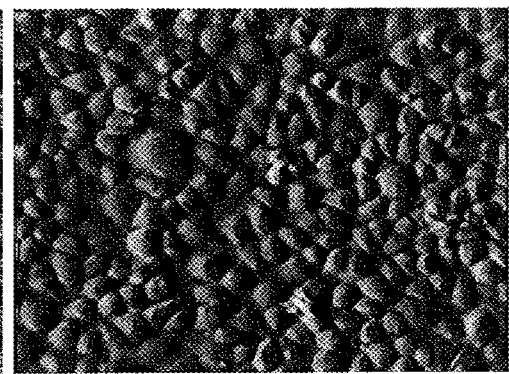

FIG. 23A, FIG. 23B, FIG. 23C, and FIG. 23D are electronic images of cells, where FIG. 23A is an electronic image when the transmission part is positioned at the position in FIG. 12A, FIG. 23B is an electronic image when the transmission part is positioned at the position in FIG. 12C, FIG. 23C and FIG. 23D are both differential images, and FIG. 23C is an image obtained by subtracting the image in FIG. 23B from the image in FIG. 23A, and FIG. 23D is an image obtained by subtracting the image in FIG. 23A from the image in FIG. 23B.

It is possible to obtain a high contrast image by generating a differential image from two images. For example, when a sample is imaged through cover glass, scratches on the cover glass or contamination on the cover glass may be superimposed in the form of a shading image on the image of the sample. Even in such a case, by performing the differential operation, it is possible to remove the shading image of scratches or contamination from the image of the sample.

Figure 24A:
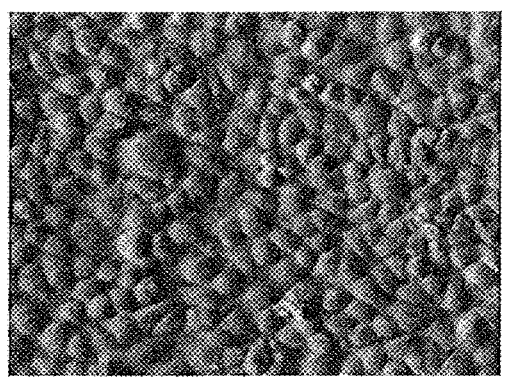
FIG. 24A, FIG. 24B, FIG. 24C, and FIG. 24D are electronic images of cells, where
Figure 24B:
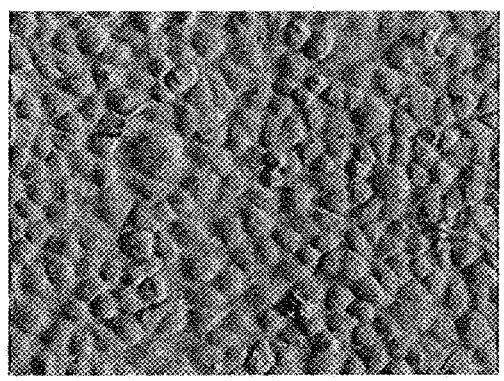
Figure 24C:
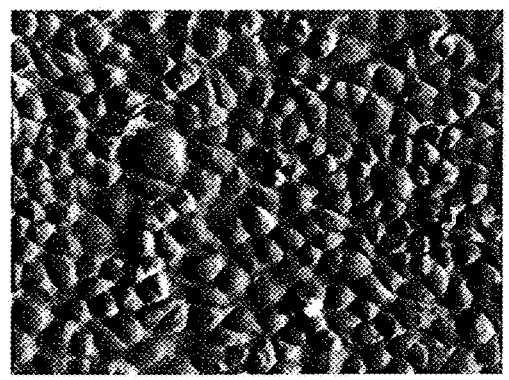
Figure 24D:
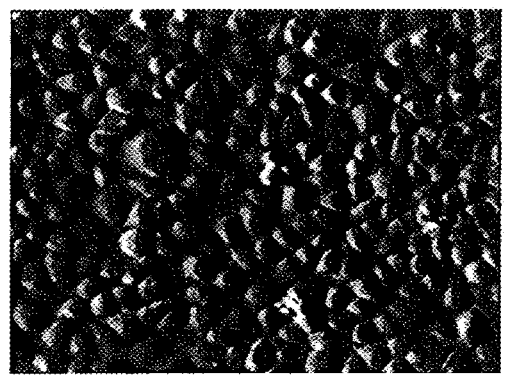

FIG. 24A, FIG. 24B, FIG. 24C, and FIG. 24D are electronic images of cells, where FIG. 24A is an electronic image when the transmission part is positioned at the position in FIG. 12A, FIG. 24B is an electronic image when the transmission part is positioned at the position in FIG. 12C, FIG. 24C and FIG. 24D are both divisional images, FIG. 24C is an image obtained by dividing the image in FIG. 24A by the image in FIG. 24B, and FIG. 24D is an image obtained by dividing the image in FIG. 24B by the image in FIG. 24A.

By generating a divisional image from two images, even when an image includes brightness variations, the brightness variations can be removed or reduced.

The present invention can include various modification examples without departing from the scope of the invention. For instance, the sample observation device of the present invention is described using an upright microscope in FIG. 1, FIG. 18, FIG. 19, and FIG. 22. However, the sample observation device of the present invention may be an inverted microscope. That is, the present invention is applicable to an inverted microscope as well.

Moreover, in FIG. 6A, FIG. 6B, and FIG. 6C, $L_0$ and $L_1$ are the lengths with reference to the optical axis $AX_i$ of the illumination optical system. However, the lengths may be set with reference to the first outer edge of the light-shielding part. Here, the position serving as a reference is the position where a line passing through the optical axis $AX_i$ of the illumination optical system and parallel to the first axis intersects the first outer edge of the light-shielding part.

In this case, in the sample observation device of the present embodiment, it is preferable that the shape of the light-shielding part is defined by a first outer edge and a second outer edge, and the first outer edge is part of the perimeter of a predetermined shape, and the predetermined shape is rotationally symmetric with respect to the optical axis of the illumination optical system, and the following conditional expression (6) is satisfied:

$$0.4 \leq (L'_0 \times \beta)/D_{ob} < 1 \qquad (6),$$

where $L'_0$ is the length from a first predetermined position to a second predetermined position, the first predetermined position is a position on which the first outer edge intersects a line passing through the optical axis of the illumination optical system and being parallel to the first axis, the second predetermined position is a position, in which the length from the optical axis of the illumination optical system is made minimum, from among positions on the inner edge of the transmission part, $D_{ob}$ is the diameter of the pupil of the objective lens, $\beta$ is a value obtained by dividing the focal length of the objective lens by the focal length of the condenser lens, and the first axis is an axis vertical to the boundary that separates the light-shielding part from the transmission part.

When Conditional Expression (6) is satisfied, a change in shape at the sample can be detected as a change in brightness. As a result, even when the sample is colorless and transparent, it is possible to obtain a sample image with shadow.

As for Conditional Expression (6), the lower limit value is preferably set to 0.5, further preferably 0.7 or 0.9.

The present invention includes the invention described below in addition to the foregoing invention.

[Appended Mode 1]

A sample observation device comprising:
an illumination optical system; and
an observation optical system, wherein
the illumination optical system includes a light source, a condenser lens, and an aperture member,
the observation optical system includes an objective lens and an imaging lens,
the aperture member has a light-shielding part or a darkening part, and a transmission part,
the transmission part is disposed asymmetrically with respect to an optical axis of the illumination optical system,
an image of an inner edge of the transmission part is formed inside of an outer edge of a pupil of the objective lens,
an image of an outer edge of the transmission part is formed outside of the outer edge of the pupil of the objective lens.

[Appended Mode 2]

The sample observation device according to Appended mode 1, wherein the following conditional expression is satisfied:

$$L_0 \times < R_{ob} < L_1 \times \beta$$

where $L_0$ is a length from the optical axis of the illumination optical system to a predetermined position, $L_1$ is a length from the optical axis of the illumination optical system to the outer edge of the transmission part, the length being on a line connecting the optical axis of the illumination optical system with the predetermined position, the predetermined position is a position, in which the length from the optical axis of the illumination optical system is made minimum, from among positions on the inner edge of the transmission part, $R_{ob}$ is a radius of the pupil of the objective lens, and $\beta$ is a value obtained by dividing a focal length of the objective lens by a focal length of the condenser lens.

[Appended Mode 3]

The sample observation device according to Appended mode 1 or 2, wherein the following conditional expression is satisfied:

$$0 \leq (L_0 \times \beta)/R_{ob} < 1,$$

where $L_0$ is a length from the optical axis of the illumination optical system to a predetermined position, the predetermined position is a position, in which the length from the optical axis of the illumination optical system is made minimum, from among positions on the inner edge of the transmission part, $R_{ob}$ is a radius of the pupil of the objective lens, and $\beta$ is a value obtained by dividing a focal length of the objective lens by a focal length of the condenser lens.

[Appended Mode 4]

The sample observation device according to Appended mode 3, wherein the following conditional expression is satisfied:

$$1 < (L_1 \times \beta)/R_{ob} \leq 2,$$

where $L_1$ is a length from the optical axis of the illumination optical system to the outer edge of the transmission part, the length being on a line connecting the optical axis of the illumination optical system with a predetermined position, the predetermined position is a position, in which the length from the optical axis of the illumination optical system is made minimum, from among positions on the inner edge of the transmission part, $R_{ob}$ is a radius of the pupil of the objective lens, and $\beta$ is a value obtained by dividing a focal length of the objective lens by a focal length of the condenser lens.

[Appended Mode 5]

The sample observation device according to any one of Appended mode 1 to 4, wherein the following conditional expression is satisfied:

$$0.2 < (R_{ob} - L_0 \times \beta)/(L_1 \times \beta - R_{ob}) < 10,$$

where $L_0$ is a length from the optical axis of the illumination optical system to a predetermined position, $L_1$ is a length from the optical axis of the illumination optical system to the outer edge of the transmission part, the length being on a line connecting the optical axis of the illumination optical system with the predetermined position, the predetermined position is a position, in which the length from the optical axis of the illumination optical system is made minimum, from among positions on the inner edge of the transmission part, $R_{ob}$ is a radius of the pupil of the objective lens, and β is a value obtained by dividing a focal length of the objective lens by a focal length of the condenser lens.

[Appended Mode 6]

The sample observation device according to any one of Appended mode 1 to 5, wherein an area of an image of the light-shielding part or the darkening part at a pupil position of the objective lens is not less than 50% of an area of the pupil of the objective lens.

[Appended Mode 7]

The sample observation device according to any one of Appended mode 1 to 6, wherein the following conditional expression is satisfied:

$$0.1 < S_{in}/S_{all} < 1,$$

where $S_{all}$ is an area of an image of the transmission part, and $S_{in}$ is an area of a part of the image of the transmission part, the part being positioned inside of the outer edge of the pupil of the objective lens.

[Appended Mode 8]

The sample observation device according to any one of Appended mode 1 to 7, wherein a line indicating a boundary between the light-shielding part or the darkening part and the transmission part is a straight line.

[Appended Mode 9]

The sample observation device according to any one of Appended mode 1 to 8, further comprising a plurality of light sources, the plurality of light sources being disposed in the transmission part.

[Appended Mode 10]

The sample observation device according to any one of Appended mode 1 to 9, further comprising:

another aperture member different from the aperture member; and a moving mechanism for moving the aperture member and the other aperture member.

[Appended Mode 11]

The sample observation device according to any one of Appended mode 1 to 10, wherein the observation optical system includes an aperture member, and the aperture member is disposed at a pupil position of the objective lens or a position conjugate with the pupil position of the objective lens.

[Appended Mode 12]

The sample observation device according to any one of Appended mode 1 to 11, wherein the light source is a monochromatic light source, or the illumination optical system includes a wavelength selecting unit.

[Appended Mode 13]

The sample observation device according to any one of Appended mode 1 to 12, further comprising an image processing device.

[Appended Mode 14]

The sample observation device according to anyone of the Appended modes 1 to 13, wherein the light-shielding part has a characteristic of blocking light in a predetermined wavelength range.

[Appended Mode 15]

The sample observation device according to anyone of the Appended modes 1 to 14, wherein the aperture member is formed from an opaque member, and the transmission part has a plurality of openings formed in the opaque member.

[Appended Mode 16]

The sample observation device according to the Appended mode 10, wherein the aperture member is a first aperture member, the other aperture member is a second aperture member, the first aperture member and the second aperture member are different apertures, the transmission part of the first aperture member is formed such that an image of an inner edge of the transmission part of the first aperture member is formed inside of an outer edge of a pupil of a first objective lens and that an image of an outer edge of the transmission part of the first aperture member is formed outside of the outer edge of the pupil of the first objective lens.

[Appended Mode 17]

The sample observation device according to the Appended mode 16, wherein the second aperture member has a transmission part corresponding to a second objective lens having a magnification different from that of the first objective lens, and the transmission part of the second aperture member is formed such that an image of an inner edge of the transmission part of the second aperture member is formed inside of an outer edge of a pupil of the second objective lens and that an image of an outer edge of the transmission part of the second aperture member is formed outside of the outer edge of the pupil of the second objective lens.

[Appended Mode 18]

The sample observation device according to any one of the Appended modes 1 to 17, further comprising a condenser unit having a reflecting surface, in place of the condenser lens.

[Appended Mode 19]

A sample observation device comprising the illumination optical system and an observation optical system, wherein the illumination optical system includes alight source, a condenser lens, and an aperture member, the observation optical system includes an objective lens and an imaging lens, the aperture member has a light-shielding part or a darkening part, a first transmission part, and a second transmission part, in the aperture member, the first transmission part is formed so as to include an optical axis of the illumination optical system, the light-shielding part or the darkening part is positioned outside of an outer edge of the first transmission part, the second transmission part is positioned outside of the first transmission part and is disposed asymmetrically with respect to the optical axis of the illumination optical system, an image of an inner edge of the second transmission part is formed inside of an outer edge of a pupil of the objective lens, and an image of an outer edge of the second transmission part is formed outside of the outer edge of the pupil of the objective lens.

[Appended Mode 20]

A sample observation device comprising an illumination optical system and an observation optical system, wherein the illumination optical system includes a light source, a condenser lens, and an aperture member, the observation optical system includes an objective lens and an imaging lens, the aperture member has a first light-shielding part or darkening part, a second light-shielding part or darkening part, a first transmission part, and a second transmission part, the aperture member is disposed such that the first light-shielding part or darkening part includes an optical axis of the illumination optical system, the first transmission part is positioned outside of an outer edge of the first light-shielding part or darkening part, the second light-shielding part or darkening part is positioned outside of an outer edge of the first transmission part, the second transmission part is positioned outside of the first transmission part and is disposed asymmetrically with respect to the optical axis of the illumination optical system, an image of an inner edge of the second transmission part is formed inside of an outer edge of a pupil of the objective lens, and an image of an outer edge of the second transmission part is formed outside of the outer edge of the pupil of the objective lens.

[Appended Mode 21]

A sample observation device comprising an illumination optical system and an observation optical system, wherein the illumination optical system includes a light source, a condenser lens, and an aperture member, the observation optical system includes an objective lens and an imaging lens, the aperture member has a light-shielding part or a darkening part, a first transmission part, and a second transmission part, the first transmission part is disposed asymmetrically with respect to an optical axis of the illumination optical system, the second transmission part is positioned outside of the light-shielding part or the darkening part, an image of an inner edge of the first transmission part is formed inside of an outer edge of a pupil of the objective lens, and an image of an outer edge of the first transmission part is formed outside of the outer edge of the pupil of the objective lens.

[Appended Mode 22]

A sample observation device comprising a light source, an optical system, and a holding member for holding an object, wherein the optical system includes a first optical system and a second optical system, the first optical system and the second optical system are disposed to be opposed to each other with the holding member interposed therebetween, the first optical system includes an aperture member, the optical system is configured to form an image of a transmission part of the aperture member at a pupil position of the second optical system, the image of the transmission part is decentered with respect to a pupil of the second optical system by refraction caused by an object, a quantity of light passing through the pupil of the second optical system differs between in one direction and in another direction opposite to the one direction by the decentering, the decentering in the one direction increases the quantity of light passing through the pupil of the second optical system, and the decentering in the other direction reduces the quantity of light passing through the pupil of the second optical system.

[Appended Mode 23]

A sample observation device comprising an illumination optical system and an observation optical system, wherein the illumination optical system includes a light source, a condenser lens, and an aperture member, the observation optical system includes an objective lens and an imaging lens, the aperture member has a light-shielding part, the light-shielding part has a shape defined by a first outer edge and a second outer edge, the first outer edge is part of the perimeter of a predetermined shape, the predetermined shape is a shape rotationally symmetric with respect to an optical axis of the illumination optical system, the first outer edge has a pair of distal ends connected to each other with the second outer edge interposed therebetween, an image of the second outer edge is formed inside of an outer edge of a pupil of the objective lens, and an image of the first outer edge is formed outside of the outer edge of the pupil of the objective lens.

[Appended Mode 24]

An aperture member configured to be disposed in an illumination optical system of a sample observation device including an objective lens, the aperture member comprising a light-shielding part or a darkening part, and a transmission part, wherein the transmission part is disposed asymmetrically with respect to an optical axis of the illumination optical system, and the transmission part is formed such that an image of an inner edge of the transmission part is formed inside of an outer edge of a pupil of the objective lens and that an image of an outer edge of the transmission part is formed outside of the outer edge of the pupil of the objective lens.

[Appended Mode 25]

A method for observing a sample by radiating a sample with light flux having a predetermined width and intersecting an optical axis of an objective lens, wherein the light flux having a predetermined width is asymmetric with respect to the optical axis of the objective lens, innermost light of the light flux having a predetermined width passes through the inside of of an outer edge of a pupil of the objective lens, and outermost light of the light flux having a predetermined width passes through the outside of of the outer edge of the pupil of the objective lens.

[Appended Mode 26]

The sample observation device according to anyone of the Appended modes 1 to 18, wherein the light-shielding part or the darkening part has a shape defined by a first outer edge and a second outer edge, the first outer edge is part of the perimeter of a predetermined shape, the predetermined shape is a shape rotationally symmetric with respect to the optical axis of the illumination optical system, and the following conditional expression is satisfied:

$$0.4 \leq (L'_0 \times \beta)/D_{ob} < 1,$$

where $L'_0$ is a length from a first predetermined position to a second predetermined position, the first predetermined position is a position on which the first outer edge intersects a line passing through the optical axis of the illumination optical system and being parallel to the first axis, the second predetermined position is a position, in which the length from the optical axis of the illumination optical system is made minimum, from among positions on the inner edge of the transmission part, $D_{ob}$ is a diameter of the pupil of the objective lens, $\beta$ is a value obtained by dividing a focal length of the objective lens by a focal length of the condenser lens, and the first axis is an axis vertical to a boundary that separates the light-shielding part from the transmission part.

Embodiments of the present invention provide a sample observation device and a sample observation method that can freely change the direction of shadows to be produced. A sample observation device and a sample method are provided that simplify the position adjustment of the aperture member.

As described above, the present invention is suitable for a sample observation device and a sample observation method that can freely change the direction of shadows to be produced. The present invention is also suitable for a sample observation device and a sample observation method that simplify the position adjustment of the aperture member.

What is claimed is:

1. A sample observation device comprising:
an illumination optical system; and
an observation optical system, wherein
the illumination optical system includes a light source, a condenser lens, and an aperture member,
the observation optical system includes an objective lens and an imaging lens,
the aperture member has a light-shielding part or a darkening part, and a transmission part,
the transmission part is disposed asymmetrically with respect to an optical axis of the illumination optical system,
an image of an inner edge of the transmission part is formed inside of an outer edge of a pupil of the objective lens,
an image of an outer edge of the transmission part is formed outside of the outer edge of the pupil of the objective lens, and
the transmission part is a transmission part that has a bow shape defined by a straight line on a side closer to the optical axis and an arc on a side away from the optical axis.

2. The sample observation device according to claim 1, wherein
the following conditional expression is satisfied:

$$L_0 \times \beta < R_{ob} < L_1 \times \beta$$

where
$L_0$ is a length from the optical axis of the illumination optical system to a predetermined position,
$L_1$ is a length from the optical axis of the illumination optical system to the outer edge of the transmission part, the length being on a line connecting the optical axis of the illumination optical system with the predetermined position,
the predetermined position is a position in which the length from the optical axis of the illumination optical system is made minimum, from among positions on the inner edge of the transmission part,
$R_{ob}$ is a radius of the pupil of the objective lens, and
$\beta$ is a value obtained by dividing a focal length of the objective lens by a focal length of the condenser lens.

3. The sample observation device according to claim 1, wherein
the following conditional expression is satisfied:

$$0 \leq (L_0 \times \beta)/R_{ob} < 1,$$

where
$L_0$ is a length from the optical axis of the illumination optical system to a predetermined position,
the predetermined position is a position, in which the length from the optical axis of the illumination optical system is made minimum, from among positions on the inner edge of the transmission part,
$R_{ob}$ is a radius of the pupil of the objective lens, and
$\beta$ is a value obtained by dividing a focal length of the objective lens by a focal length of the condenser lens.

4. The sample observation device according to claim 3, wherein
the following conditional expression is satisfied:

$$1 < (L_1 \times \beta)/R_{ob} \leq 2,$$

where
$L_1$ is a length from the optical axis of the illumination optical system to the outer edge of the transmission part, the length being on a line connecting the optical axis of the illumination optical system with a predetermined position,
the predetermined position is a position, in which the length from the optical axis of the illumination optical system is made minimum, from among positions on the inner edge of the transmission part,
$R_{ob}$ is a radius of the pupil of the objective lens, and
$\beta$ is a value obtained by dividing a focal length of the objective lens by a focal length of the condenser lens.

5. The sample observation device according to claim 1, wherein
the following conditional expression is satisfied:

$$0.2 < (R_{ob} - L_0 \times \beta)/(L_1 \times \beta - R_{ob}) < 10,$$

where
$L_0$ is a length from the optical axis of the illumination optical system to a predetermined position,
$L_1$ is a length from the optical axis of the illumination optical system to the outer edge of the transmission part, the length being on a line connecting the optical axis of the illumination optical system with the predetermined position,
the predetermined position is a position, in which the length from the optical axis of the illumination optical system is made minimum, from among positions on the inner edge of the transmission part,
$R_{ob}$ is a radius of the pupil of the objective lens, and
$\beta$ is a value obtained by dividing a focal length of the objective lens by a focal length of the condenser lens.

6. The sample observation device according to claim 1, wherein an area of an image of the light-shielding part or the darkening part at a pupil position of the objective lens is not less than 50% of an area of the pupil of the objective lens.

7. The sample observation device according to claim 1, wherein
the following conditional expression is satisfied:

$$0.1 < S_{in}/S_{all} < 1,$$

where
$S_{all}$ is an area of an image of the transmission part, and
$S_{in}$ is an area of a part of the image of the transmission part, the part being positioned inside of the outer edge of the pupil of the objective lens.

8. The sample observation device according to claim 1, wherein a line indicating a boundary between the light-shielding part or the darkening part and the transmission part is a straight line.

9. The sample observation device according to claim 1, further comprising
a plurality of light sources,
the plurality of light sources being disposed in the transmission part.

10. The sample observation device according to claim 1, further comprising:
another aperture member different from the aperture member; and
a moving mechanism for moving the aperture member and the other aperture member.

11. The sample observation device according to claim 1, wherein
the observation optical system includes an aperture member, and
the aperture member is disposed at a pupil position of the objective lens or a position conjugate with the pupil position of the objective lens.

12. The sample observation device according to claim 1, wherein the light source is a monochromatic light source, or the illumination optical system includes a wavelength selecting unit.

13. The sample observation device according to claim 1, further comprising an image processing device.

14. A sample observation device comprising:
a light source;
an optical system; and
a holding member for holding an object, wherein
the optical system includes a first optical system and a second optical system,
the first optical system and the second optical system are disposed to be opposed to each other with the holding member interposed therebetween,
the first optical system includes an aperture member,
the optical system is configured to form an image of a transmission part of the aperture member at a pupil position of the second optical system,
the transmission part is disposed asymmetrically with respect to an optical axis of the first optical system,
an image of an inner edge of the transmission part is formed inside of an outer edge of a pupil of the second optical system,
an image of an outer edge of the transmission part is formed outside of the outer edge of the pupil of the second optical system,
the transmission part is a transmission part that has a bow shape defined by a straight line on a side closer to the optical axis and an arc on a side away from the optical axis,
an image of the transmission part is decentered with respect to the pupil of the second optical system by refraction caused by an object,
a quantity of light passing through the pupil of the second optical system differs between in one direction and in another direction opposite to the one direction by the decentering,
the decentering in the one direction increases the quantity of light passing through the pupil of the second optical system, and
the decentering in the other direction reduces the quantity of light passing through the pupil of the second optical system.

* * * * *